United States Patent
Tsuda

(10) Patent No.: US 12,150,030 B2
(45) Date of Patent: Nov. 19, 2024

(54) COMMUNICATION CONTROL APPARATUS, COMMUNICATION APPARATUS, COMMUNICATION CONTROL METHOD, COMMUNICATION METHOD, COMMUNICATION CONTROL PROGRAM, COMMUNICATION PROGRAM, AND COMMUNICATION SYSTEM

(71) Applicant: Sony Corporation, Tokyo (JP)

(72) Inventor: Shinichiro Tsuda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 715 days.

(21) Appl. No.: 17/274,191

(22) PCT Filed: Sep. 24, 2019

(86) PCT No.: PCT/JP2019/037195
§ 371 (c)(1),
(2) Date: Mar. 8, 2021

(87) PCT Pub. No.: WO2020/080044
PCT Pub. Date: Apr. 23, 2020

(65) Prior Publication Data
US 2021/0345218 A1    Nov. 4, 2021

(30) Foreign Application Priority Data
Oct. 16, 2018    (JP) .................................. 2018-195447

(51) Int. Cl.
*H04W 40/12* (2009.01)
*H04W 48/16* (2009.01)
(Continued)

(52) U.S. Cl.
CPC .......... *H04W 40/12* (2013.01); *H04W 48/16* (2013.01); *H04W 72/0453* (2013.01);
(Continued)

(58) Field of Classification Search
None
See application file for complete search history.

(56) References Cited

U.S. PATENT DOCUMENTS

2011/0080864 A1* 4/2011 Cai ....................... H04W 36/30
370/332
2014/0016537 A1* 1/2014 Khobare ........... H04W 36/0079
370/315
(Continued)

OTHER PUBLICATIONS

Huawei, "Slice support of IAB nodes", Aug. 20-24, 2018, 3GPP TSG-RAN3 Meeting #101, R3-184806, pp. 1-4 (Year: 2018).*
(Continued)

*Primary Examiner* — Steve R Young
(74) *Attorney, Agent, or Firm* — XSENSUS LLP

(57) ABSTRACT

A communication control apparatus includes: an acquisition section (231) that acquires information concerning a service to be received, using a communication system (1), by a communication apparatus connected to the communication system (1) that includes a relay base station (30) to which the communication apparatus is connectable and a donor base station (20) which provides the relay base station (30) with a wireless backhaul line; and a determination section (232) that determines a path through which data exchanged between the communication apparatus and the donor base station (20) passes on a basis of the information concerning the service.

15 Claims, 18 Drawing Sheets

(51) Int. Cl.
*H04W 72/04* (2023.01)
*H04W 72/0453* (2023.01)
*H04W 92/14* (2009.01)
*H04W 92/20* (2009.01)
*H04W 16/26* (2009.01)

(52) U.S. Cl.
CPC ........... *H04W 92/14* (2013.01); *H04W 92/20* (2013.01); *H04W 16/26* (2013.01)

(56) References Cited

U.S. PATENT DOCUMENTS

| | | | | |
|---|---|---|---|---|
| 2017/0164349 | A1* | 6/2017 | Zhu | H04W 40/20 |
| 2018/0337846 | A1* | 11/2018 | Lee | H04W 28/082 |
| 2018/0376380 | A1* | 12/2018 | Leroux | H04W 76/27 |
| 2020/0029264 | A1* | 1/2020 | Wang | H04W 36/0058 |
| 2020/0084663 | A1* | 3/2020 | Park | H04W 8/08 |
| 2020/0383031 | A1* | 12/2020 | Gu | H04W 36/0072 |
| 2021/0321395 | A1* | 10/2021 | Leng | H04W 72/27 |

OTHER PUBLICATIONS

International Search Report and Written Opinion mailed on Dec. 24, 2019, received for PCT Application PCT/JP2019/037195 Filed on Sep. 24, 2019, 9 pages including English Translation.
Samsung, "Motivation for Integrated Backhaul and Access", 3GPP TSG RAN Meeting #75, RP-170168, Mar. 6-9, 2017, pp. 1-5.
Huawei, "Slice Support of IAB Nodes", 3GPP TSG RAN3 Meeting #101, R1-184806, Aug. 20-24, 4 pages.
TCL Communication, "QoS and Route Selection for IAB", 3GPP TSG-RAN WG2 NR AH1807 Meeting, R2-1810114, Jul. 2-6, 2018, pp. 1-2.
Sony, "Route Management in IAB", 3GPP TSG-RAN WG2 NR AH1807 Meeting, R2-1810116, Jul. 2-6, 2018, 3 pages.
Huawei, "UP Protocol Design for Architecture 1a", 3GPP TSG-RAN WG3 Meeting Ad Hoc, R3-183824, Jul. 2-6, 2018, pp. 1-6.
Samsung Electronics R & D Institute UK (Rapporteur), "Outcome of e-mail Discussion [AH1807#08] [IAB]: TP for TR 38.874 on Adaptation Layer", 3GPP TSG-RAN WG2 NR ad-hoc #18-07, R2-1810973, Jul. 2-6, 2018, 5 pages.
Ericsson, "Supporting Slicing in IAB Networks", 3GPP TSG-RAN WG2 Meeting #103bis, R2-1814366, Oct. 8-12, 2018, 7 pages.

* cited by examiner

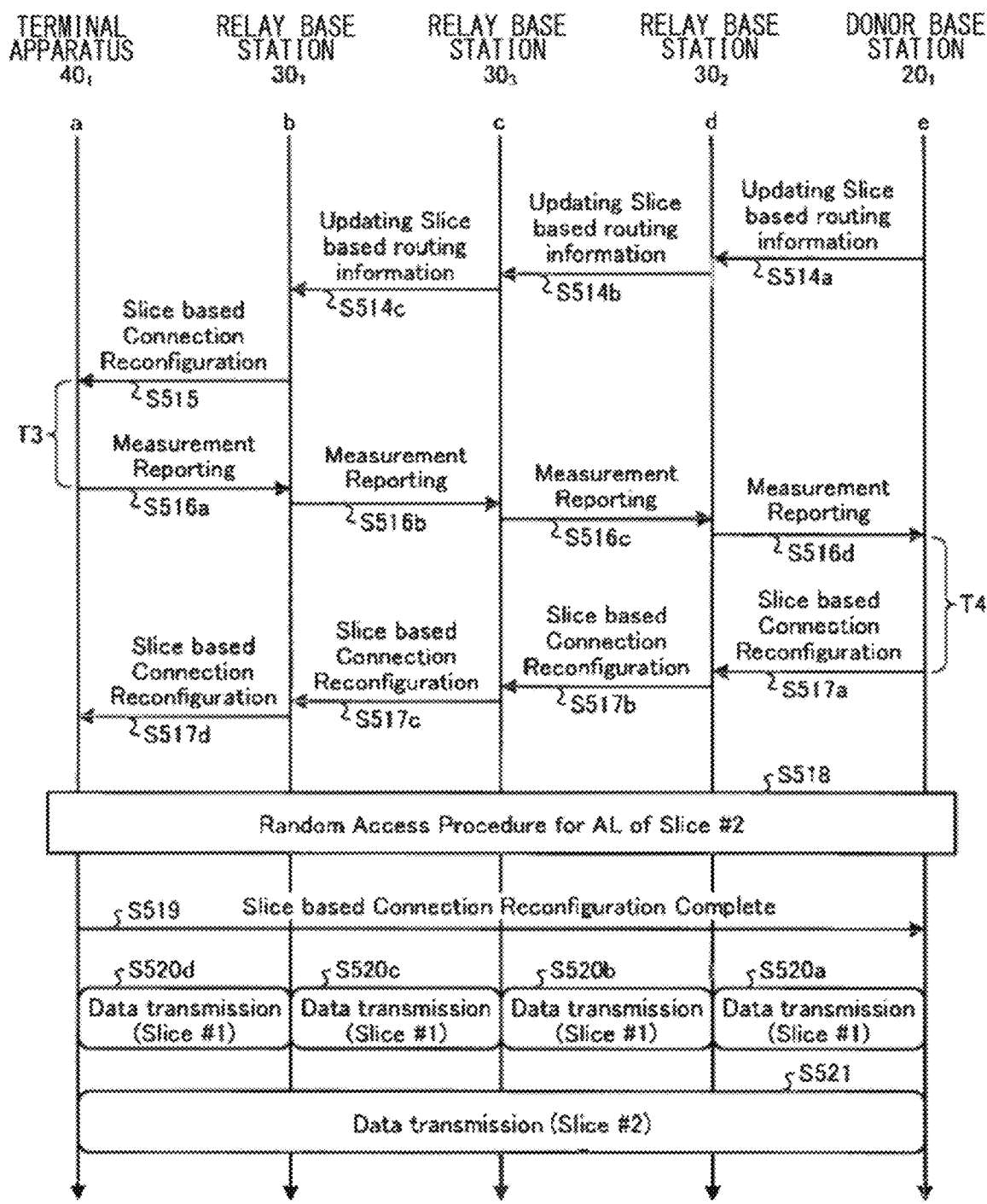

US 12,150,030 B2

COMMUNICATION CONTROL APPARATUS, COMMUNICATION APPARATUS, COMMUNICATION CONTROL METHOD, COMMUNICATION METHOD, COMMUNICATION CONTROL PROGRAM, COMMUNICATION PROGRAM, AND COMMUNICATION SYSTEM

CROSS-REFERENCE TO RELATED APPLICATIONS

The present application is based on PCT filing PCT/JP2019/037195, filed Sep. 24, 2019, which claims priority to JP 2018-195447, filed Oct. 16, 2018, the entire contents of each are incorporated herein by reference.

TECHNICAL FIELD

The present disclosure relates to a communication control apparatus, a communication apparatus, a communication control method, a communication method, a communication control program, a communication program, and a communication system.

BACKGROUND ART

A technique called a relay has been used heretofore to complement an area where a radio wave is difficult to reach. In recent years, attention has been paid to a technique of using wireless communication for a backhaul line between a relay base station and a donor base station.

CITATION LIST

Non-Patent Literature

NPTL 1: "Motivation for Integrated Backhaul and Access", 3GPP RP-170168, Samsung, March 2017
NPTL 2: "Study on Integrated Access and Backhaul for NR", 3GPP RP-172290, Qualcomm Incorporated, December 2017

SUMMARY OF THE INVENTION

Problem to be Solved by the Invention

In a case where wireless communication is employed for a backhaul line between a relay base station and a donor base station, it is assumed that communication between a communication apparatus and the donor base station connected to the relay base station becomes unstable. For example, assume that a millimeter wave is utilized for the backhaul line. A millimeter wave has a large propagation loss, and has a large dynamic change in communication quality. Accordingly, in a case where the millimeter wave is utilized for the backhaul line, it is assumed that switching of paths between the communication apparatus and the donor base station occurs frequently. This results in more signaling of the donor base station, thus possibly causing communication instability.

The present disclosure therefore proposes a communication control apparatus, a communication apparatus, a communication control method, a communication method, a communication control program, a communication program, and a communication system that make it possible to achieve stable communication.

Means for Solving the Problem

In order to solve the above-described issue, a communication control apparatus according to an embodiment of the present disclosure includes: an acquisition section that acquires information concerning a service to be received, using a communication system, by a communication apparatus connected to the communication system that includes a relay base station to which the communication apparatus is connectable and a donor base station which provides the relay base station with a wireless backhaul line; and a determination section that determines a path through which data exchanged between the communication apparatus and the donor base station passes on a basis of the information concerning the service.

BRIEF DESCRIPTION OF THE DRAWINGS

FIG. 15B illustrates the example of the signaling flow according to the optimum path selection corresponding to the slice ID.

MODES FOR CARRYING OUT THE INVENTION

Figure 1:
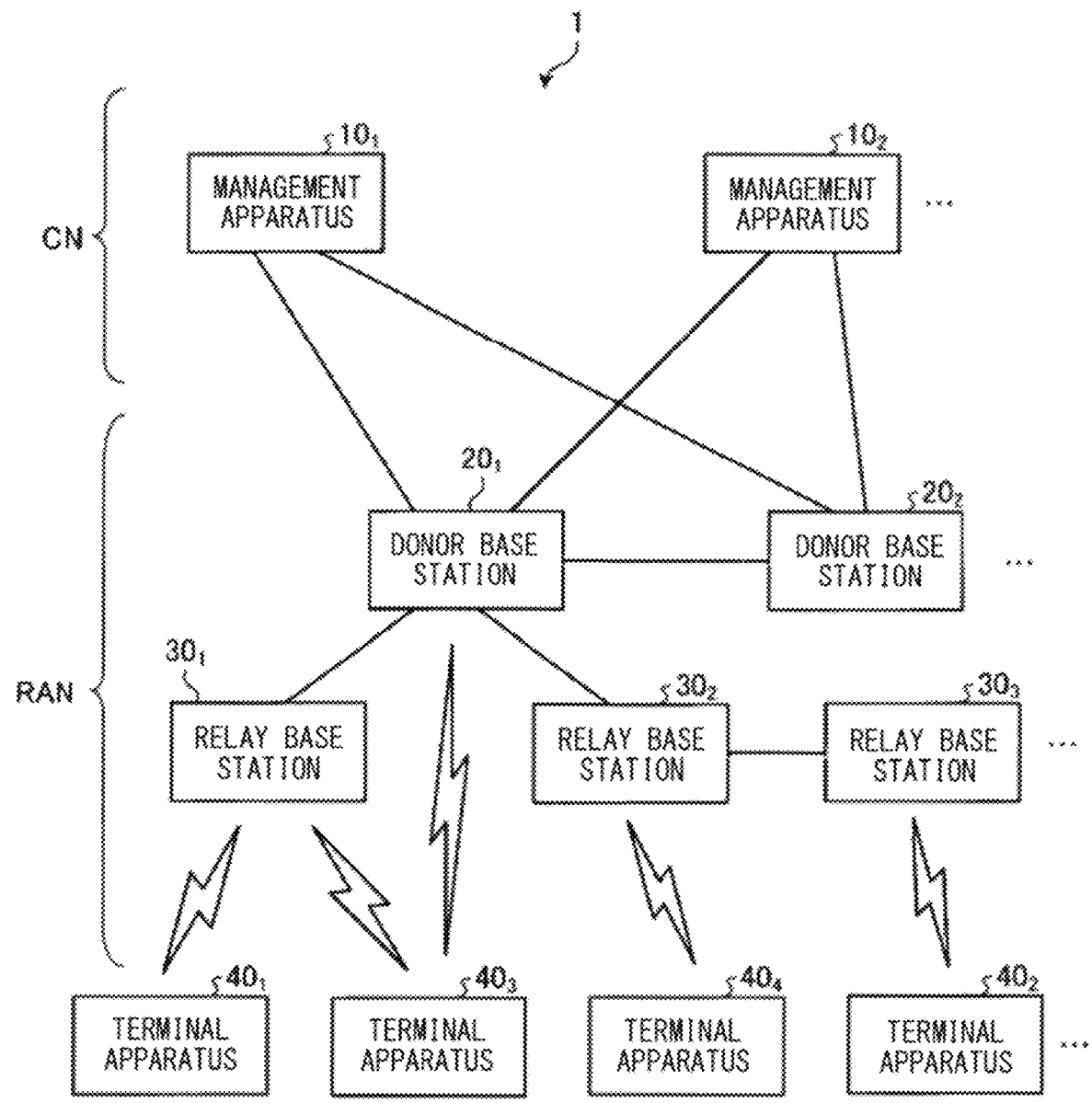
FIG. 1 illustrates a configuration example of a communication system according to an embodiment of the present disclosure.

Hereinafter, description is given in detail of embodiments of the present disclosure with reference to the drawings. It is to be noted that, in each of the following embodiments, repeated description is omitted by assigning the same reference numerals to the same parts.

In addition, there is also a case where, in the present specification and drawings, components having substantially the same functional configuration may be assigned with the same reference numerals followed by different numerals to distinguish the components. For example, the components having substantially the same functional configuration are distinguished, as in donor base stations $20_1$ and $20_2$, as necessary. However, in a case where it is unnecessary to particularly distinguish among components having substantially the same functional configuration, only the same reference numerals are assigned. For example, in a case where it is unnecessary to particularly distinguish between the donor base stations $20_1$ and $20_2$, the component is only referred to as a donor base station 20.

In addition, description is given of the present disclosure in accordance with the order of items indicated below.
1. Introduction
2. Configuration of Communication System
    2-1. Overall Configuration of Communication System
    2-2. Configuration of Management Apparatus
    2-3. Configuration of Donor Base Station
    2-4. Configuration of Relay Base Station
    2-5. Configuration of Terminal Apparatus
3. Path Selection Examples
    3-1. Basic Path Selection Example
    3-2. Path Selection Example in a case of Deterioration in Communication Quality
    3-3. Path Selection Example depending on Service Utilized by Terminal Apparatus
    3-4. Path Selection Example in a case where Terminal Apparatus Receives a Plurality of Services
4. Operation of Communication System
    4-1. Connection Processing in a case where there is No Network Slice Information from Nearby Base Station
    4-2. Monitoring Processing of Quality of Backhaul Line
    4-3. Handover Processing of Backhaul Line
    4-4. Handover Processing of Access Line
    4-5. Signaling Flow according to Optimum Path Selection corresponding to Slice ID
    4-6. Connection Processing of Terminal Apparatus based on Slice ID
    4-7. Handover Processing of Terminal Apparatus based on Slice ID
5. Modification Examples
6. Closing

1. INTRODUCTION

A technique called a relay is used, in some cases, for the purpose of supplementing an area where a radio wave is difficult to reach, such as Indoor. As for the relay, there are relay techniques of various configurations from those having a function of only amplifying a signal called a repeater or a booster to those equipped with the same function as that of a base station called L3 relay standardized by Rel-10 of 3GPP (3rd Generation Partnership Project).

The 3GPP (3rd Generation Partnership Project) is a project for consideration of a radio access technology (RAT: Radio Access Technology) such as such as LTE (Long Term Evolution) and NR (New Radio). The 3GPP has currently been considering a fifth-generation mobile communication system (5G).

The LTE and the NR are each one type of a cellular communication technique, and each arrange a plurality of areas to be covered by a base station in a cell shape to thereby enable mobile communication of a terminal apparatus. It is to be noted that, in the following description, the "LTE" includes LTE-A (LTE-Advanced), LTE-A Pro (LTE-Advanced Pro), and EUTRA (Evolved Universal Terrestrial Radio Access). In addition, the NR includes NRAT (New Radio Access Technology) and FEUTRA (Further EUTRA). It is to be noted that a single base station may manage a plurality of cells. In the following description, a cell corresponding to the LTE is referred to as an LTE cell, and a cell corresponding to the NR is referred to as an NR cell.

The NR is a radio access technology (RAT) of the next generation (fifth generation) of the LTE. The NR is a radio access technology that is able to correspond to various use cases including eMBB (Enhanced Mobile Broadband), mMTC (Massive Machine Type Communications), and URLLC (Ultra-Reliable and Low Latency Communications). The NR has been considered with the aim of a technical framework corresponding to a utilization scenario, a required condition, an arrangement scenario, and the like in these use cases.

The fifth-generation mobile communication system (5G) is expected to achieve high-capacity wireless communication on a par with an optical line through utilization of a 28 GHz band or a millimeter wave. In the 5G, the utilization of the millimeter wave may possibly provide a lower-cost and higher-capacity wireless backhaul than the optical fiber. For example, the 3GPP has started standardization of IAB (Integrated Access and Backhaul) which utilizes the NR in a millimeter wave also as the backhaul. It is to be noted that a millimeter has a short propagation distance. Accordingly, in a case of utilizing a millimeter wave for the backhaul, it is assumed that multihop relaying a plurality of relays (relay base stations) is used from a base station (donor base station) to a terminal apparatus.

The millimeter wave has many dynamic changes in communication quality, and thus it is expected that the paths from the donor base station to the terminal apparatus switch frequently in a case where the millimeter wave is used for the backhaul. The frequent switching between paths is not limited to the case of using the millimeter wave for the backhaul, as a matter of course, but is also assumed in a case where a radio wave other than the millimeter wave is utilized for the backhaul. In a case where the paths are switched frequently, stability of communication may possibly be impaired.

In the present embodiment, a communication system includes a relay base station and a donor base station that provides the relay base station with a wireless backhaul line. Further, a communication control apparatus included in the communication system determines a path through which data exchanged between the terminal apparatus and the donor base station passes, on the basis of information concerning a service to be received by the terminal apparatus using the communication system (e.g., information on whether or not the service requires high-speed communication). The communication control apparatus determines a path depending on the service, thus achieving stable communication.

It is to be noted that the 5G introduces a concept of network slicing for providing a communication service optimized for various communication characteristics corresponding to use cases, and thus requires a mechanism of switching paths in consideration of the network slicing. In the present embodiment, the communication control apparatus switches paths in consideration of the network slicing (hereinafter, also referred to as network slice), thereby achieving stable communication.

2. CONFIGURATION OF COMMUNICATION SYSTEM

Hereinafter, description is given of a communication system 1 according to an embodiment of the present disclosure. A wireless network included in the communication system 1 is, for example, a wireless network using a radio access system specified in the NR. The communication system 1 may include a wireless network of a radio access system other than that of the NR. The communication system 1 of the present embodiment supports a plurality of network slices.

It is to be noted that the concept of the base station (hereinafter, also referred to as a base station apparatus) includes not only the donor base station but also the relay base station (hereinafter, also referred to as a relay station or a relay station apparatus). In addition, the concept of the base station includes not only a structure (Structure) provided with functions of the base station, but also an apparatus installed in the structure. The structure is, for example, a building such as a high-rise building, a house, a steel tower, a station facility, an airport facility, a port facility, and a stadium. It is to be noted that the concept of the structure includes not only the building but also a structure (Non-building structure) such as a tunnel, a bridge, a dam, a wall, and a steel pole, as well as equipment such as a crane, a gate, and a windmill. In addition, the concept of the structure includes not only a ground (land) or underground structure, but also a waterborne structure such as a pier, a mega-float, as well as an underwater structure such as an ocean observation facility.

In addition, the base station may be a base station apparatus configured to be movable. For example, the base station may be an apparatus installed in a mobile body, or may be a mobile body itself. The mobile body may be a mobile terminal, such as a smartphone. In addition, the mobile body may be a mobile body (e.g., an automobile, a bus, a truck, a train, a linear motor car, etc.) that moves on the ground (land), or may be a mobile body (e.g., a subway) that moves underground (e.g., inside a tunnel). In addition, the mobile body may be a mobile body that moves on the water (e.g., a vessel such as a passenger ship, a cargo ship, a hovercraft, etc.), or may be a mobile body that moves underwater (e.g., a submarine ship such as a submersible vessel, a submarine, an unmanned underwater vehicle, etc.). In addition, the mobile body may be a mobile body that travels inside the atmosphere (e.g., an aircraft such as an airplane, an airship, a drone, etc.), or may be a mobile body that travels outside the atmosphere (e.g., an artificial celestial body such as an artificial satellite, a spacecraft, a space station, a probe vehicle, etc.).

It is to be noted that the LTE base station may be referred to as eNodeB (Evolved Node B) or eNB in some instances. In addition, the NR base station may be referred to as gNodeB or gNB in some instances. In addition, in the LTE and the NR, a terminal apparatus (also referred to as a mobile station, a mobile station apparatus, or a terminal) may be referred to as a UE (User Equipment) in some instances. It is to be noted that the terminal apparatus is one type of a communication apparatus, and is also referred to as a mobile station, a mobile station apparatus, or a terminal. In an embodiment of the present disclosure, the concept of the communication apparatus includes not only a portable terminal apparatus such as a handheld terminal, but also an apparatus installed in a structure or a mobile body, for example. In addition, the concept of the communication apparatus includes not only the terminal apparatus but also the base station (donor base station, relay base station, etc.).

<2-1. Overall Configuration of Communication System>

FIG. 1 illustrates a configuration example of the communication system 1 according to an embodiment of the present disclosure. The communication system 1 includes a management apparatus 10, a donor base station 20, a relay base station 30, and a terminal apparatus 40. The communication system 1 operates in conjunction with wireless communication apparatuses configuring the communication system 1 to thereby provide a wireless network enabling mobile communication to a user. The wireless communication apparatus refers to an apparatus having a function of wireless communication, and corresponds to the donor base station 20, the relay base station 30, and the terminal apparatus 40 in the example of FIG. 1. In the following description, the wireless communication apparatus may simply be referred to as a communication apparatus in some instances.

It is to be noted that, in the present embodiment, one or a plurality of apparatuses included in the communication system 1 function as the communication control apparatus that determines a path from a donor base station to a terminal apparatus. In the following description, a communication management apparatus is described as being the donor base station 20; however, the communication control apparatus is not limited to the donor base station 20. The communication management apparatus may be the management apparatus 10 or an apparatus other than the management apparatus 10 and the donor base station 20.

The communication system 1 may include a plurality of management apparatuses 10, a plurality of donor base stations 20, a plurality of relay base stations 30, and a plurality of terminal apparatuses 40. In the example of FIG. 1, the communication system 1 includes, as the management apparatus 10, management apparatuses $10_1$, $10_2$, etc. In addition, the communication system 1 includes, as the donor base station 20, donor base stations $20_1$, $20_2$, etc., and includes, as the relay base station 30, relay base stations $30_1$, $30_2$, $30_3$, etc. In addition, the communication system 1 includes, as the terminal apparatus 40, terminal apparatuses $40_1$, $40_2$, $40_3$, $40_4$, etc.

The management apparatus 10 is an apparatus that manages a wireless network. For example, the management apparatus 10 is an apparatus that functions as an MME (Mobility Management Entity) or an AMF (Access and Mobility Management Function). The management apparatus 10 configures a core network CN. The core network CN is, for example, an EPC (Evolved Packet Core) or a 5GC (5G Core network). The management apparatus 10 is connected to each of the plurality of donor base stations 20. The management apparatus 10 manages communication of the donor base station 20. The management apparatus 10 may manage communication of the relay base station 30.

The donor base station 20 is a base station that wirelessly communicates with the terminal apparatus 40. The donor base station 20 is able to wirelessly communicate with the terminal apparatus 40. The donor base station 20 may be configured to be able to wirelessly communicate with another donor base station 20 and the relay base station 30.

The donor base station 20 may be a terrestrial base station apparatus (terrestrial station apparatus) installed on the ground. For example, the donor base station 20 may be a base station apparatus disposed on a structure on the ground, or may be a base station apparatus installed in a mobile body that moves on the ground. More specifically, the donor base station 20 may be an antenna installed on a structure such as a building or a signal processing apparatus connected to the antenna. The donor base station 20 may be a structure or a mobile body itself, as a matter of course. The "ground" means not only the ground (land) but also the ground in a broad sense, including underground, overwater, and underwater. It is to be noted that the donor base station 20 is not limited to the terrestrial base station. The donor base station 20 may be a non-terrestrial base station (non-terrestrial station) that is able to float in the air or space. For example, the donor base station 20 may be an aircraft station apparatus or a satellite station apparatus.

The aircraft station apparatus is a wireless communication apparatus that is able to float in the atmosphere, such as an aircraft. The aircraft station apparatus may be an apparatus mounted on an aircraft, etc., or may be an aircraft itself. It is to be noted that the concept of aircraft includes not only an HTA aircraft such as an airplane or a glider, but also an LTA aircraft such as a balloon or an airship. In addition, the concept of aircraft includes not only the HTA aircraft and the LTA aircraft, but also a rotorcraft such as a helicopter and an autogiro. It is to be noted that the aircraft station apparatus (or an aircraft mounted with the aircraft station apparatus) may be an unmanned aircraft such as a drone. It is to be noted that the concept of unmanned aircraft also includes an unmanned aircraft system (UAS: Unmanned Aircraft System) and a tethered unmanned aircraft system (tethered UAS). In addition, the concept of unmanned aircraft includes an LTA unmanned aircraft system (LTA: Lighter than Air UAS) and an HTA unmanned aircraft system (HTA: Heavier than Air UAS). Other than those described above, the concept of unmanned aircraft also includes a high-altitude unmanned aircraft system platform (HAPs: High Altitude UAS Platforms).

The satellite station apparatus is a wireless communication apparatus that is able to float outside the atmosphere. The satellite station apparatus may be an apparatus mounted on a space mobile body such as an artificial satellite, or may be a space mobile body itself. The satellite serving as the satellite station apparatus may be any of a low earth orbiting (LEO: Low Earth Orbiting) satellite, a medium earth orbiting (MEO: Medium Earth Orbiting) satellite, a geostationary earth orbiting (GEO: Geostationary Earth Orbiting) satellite, and a highly elliptical orbiting (HEO: Highly Elliptical Orbiting) satellite. The satellite station apparatus may be an apparatus mounted on the low earth orbiting satellite, the medium earth orbiting satellite, the geostationary earth orbiting satellite, or the highly elliptical orbiting satellite, as a matter of course.

It is to be noted that, in the example of FIG. 1, the donor base station $20_1$ is connected to the relay base station 30. The donor base station $20_1$ is able to wirelessly communicate with the terminal apparatus 40 indirectly via the relay base station $30_1$. Likewise, the donor base station $20_2$ is able to wirelessly communicate with the terminal apparatus 40 indirectly via the relay base station 30.

The relay base station 30 is an apparatus serving as a relay station of base stations. The relay base station 30 is one type of the base station. The relay base station 30 is able to wirelessly communicate with the terminal apparatus 40. The relay base station 30 relays communication between the donor base station 20 and the terminal apparatus 40. It is to be noted that the relay base station 30 may be configured to be able to wirelessly communicate with another relay base station 30 and the donor base station 20. In the concept of the IAB, the relay base station 30 may operate as a MT (Mobile Termination) function with respect to the donor base station 20 or as the UE, and may operate as a DU (Distributed Unit) with respect to the other relay base station 30 (child relay base station). The relay base station 30 may be a terrestrial station apparatus, or may be a non-terrestrial station apparatus. The relay base station 30 configures a radio access network RAN, together with the donor base station 20.

The terminal apparatus 40 is, for example, a mobile phone, a smart device (smartphone or tablet), a PDA (Personal Digital Assistant), or a personal computer. In addition, the terminal apparatus 40 may be an M2M (Machine to Machine) device or an IoT (Internet of Things) device. In addition, the terminal apparatus 40 may be a wireless communication apparatus installed in a mobile body, or may be a mobile body itself. The terminal apparatus 40 is able to wirelessly communicate with the donor base station 20 and the relay base station 30. It is to be noted that the terminal apparatus 40 may also be able to perform wireless communication, e.g., D2D (Device to Device) communication, in communication (sidelink) with another terminal apparatus 40. Here, the D2D communication may be interface-compliant communication called PC5.

Figure 2:
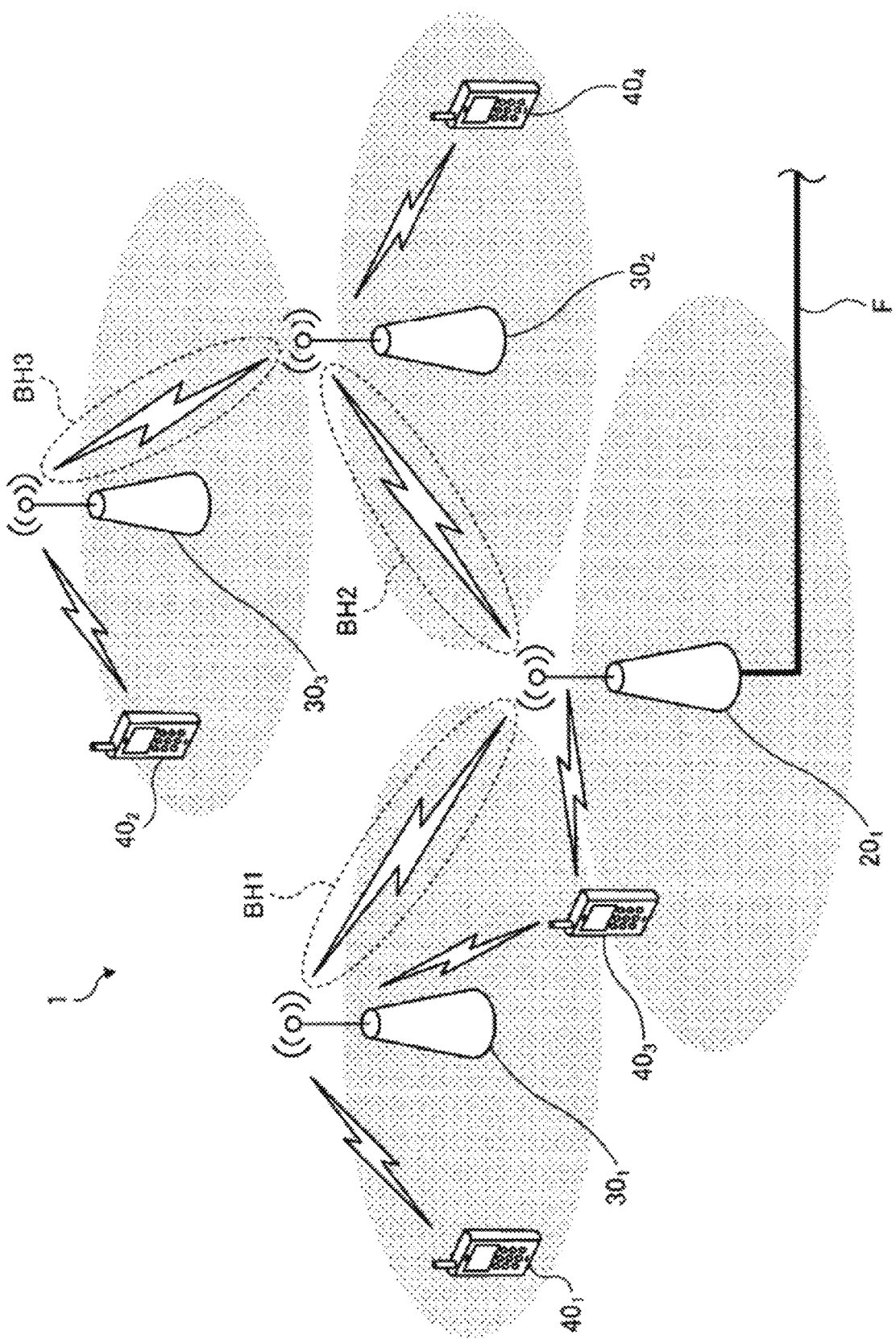
FIG. 2 is an explanatory diagram of IAB.

As described above, the 3GPP has started the standardization of the IAB which utilizes the NR in a millimeter wave also as the backhaul. FIG. 2 is an explanatory diagram of the IAB. In the example of FIG. 2, a base station having an optical fiber F in a backhaul (donor base station $20_1$ illustrated in FIG. 2) operates as a donor base station, and provides wireless backhaul lines BH1 and BH2 directly or indirectly to other base stations (relay base stations $30_1$, $30_2$, and $30_3$). It is to be noted that, in the example of FIG. 2, the relay base station $30_2$, as a parent relay base station, provides the relay base station $30_3$ with a wireless backhaul line BH3. It is to be noted that, although FIG. 2 exemplifies the case where there are three relay base stations, the number of the relay base stations may be less than three or may be more than three. More particularly, the donor base station $20_1$ operates as a parent node (Parent node), and the relay base station $30_3$ operates as a child node (Child node), with the relay base station $30_2$ as a reference. A downlink (DL) of the wireless backhaul line BH2 is called a DL Parent BH, an uplink (UL) of the wireless backhaul line BH2 is called a UL Parent BH, a DL of the wireless backhaul line BH3 is called a DL Child BH, and a UL of the wireless backhaul line BH3 is called a UL Child BH.

Here, the donor base station 20 is able to provide any wireless communication apparatus with an access line simultaneously, in addition to the backhaul line. Here, when providing the backhaul line and the access line, the donor base station 20 may have a means to distinguish between the relay base station and any wireless communication apparatus. The providing of the backhaul line and the access line may include at least processing of allocating Radio Resource, e.g., Physical Resource Block (PRB) and scheduling. In the example of FIG. 2, the donor base station $20_1$ provides the relay base stations $30_1$ and $30_2$ with the backhaul lines BH1 and BH2, and, at the same time, provides the terminal apparatus $40_3$ with the access line. It is to be noted that the donor base station 20 may support time, frequency, and spatial multiplexing, as a multiplexing method of the access line and the backhaul line.

Likewise, the relay base station 30 is able to construct the backhaul line BH1, and, at the same time, is able to provide any wireless communication apparatus with the access line. Here, when providing the backhaul line and the access line, the relay base station 30 may have a means to distinguish between the relay base station and any wireless communication apparatus. The providing of the backhaul line and the access line may include at least processing of allocating the Radio Resource, e.g., the PRB and scheduling. In the example of FIG. 2, the relay base station $30_1$ constructs the backhaul line together with the donor base station $20_1$, and, at the same time, provides the terminal apparatus $40_1$ with the access line. In addition, the relay base station 30 constructs the backhaul lines BH2 and BH3 together with the donor base station $20_1$ and the relay base station $30_3$, and, at the same time, provides the terminal apparatus $40_4$ with the access line. Further, the relay base station $30_3$ constructs the backhaul line BH3 together with the relay base station $30_3$, and, at the same time, provides the terminal apparatus $40_2$ with the access line. The relay base station 30 may support time, frequency, and spatial multiplexing, as a multiplexing method of the access line and the backhaul line.

Hereinafter, specific description is given of configurations of the respective apparatuses configuring the communication system 1 according to an embodiment.

<2-2. Configuration of Management Apparatus>

The management apparatus 10 is an apparatus that manages a wireless network. For example, the management apparatus 10 is an apparatus that manages communication of the donor base station 20. The management apparatus 10 may manage communication of the relay base station 30. When the core network is the EPC, the management apparatus 10 is an apparatus having a function as the MME (mobility Management Entity), for example. In addition, when the core network is the 5GC, the management apparatus 10 is an apparatus having a function as the AMF (Access and Mobility Management Function), for example. The management apparatus 10 is not limited to the apparatuses having the function as the MME or AMF, as a matter of course. For example, some or all of the functions of the management apparatus 10 may be consolidated into a Central Unit (CU) function in the concept of IAB. The CU function may be implemented in the donor base station 20.

It is to be noted that the management apparatus 10 may have a gateway function. For example, when the core network is the EPC, the management apparatus 10 may have a function as a S-GW (Serving Gateway) or a P-GW (Packet Data Network Gateway). In addition, when the core network is the 5GC, the management apparatus 10 may have a function as a UPF (User Plane Function). It is to be noted that the management apparatus 10 does not necessarily need to be an apparatus configuring the core network. For example, suppose that the core network is a core network of W-CDMA (Wideband Code Division Multiple Access) or cdma 2000 (Code Division Multiple Access 2000). At this time, the management apparatus 10 may be an apparatus functioning as an RNC (Radio network Controller).

Figure 3:
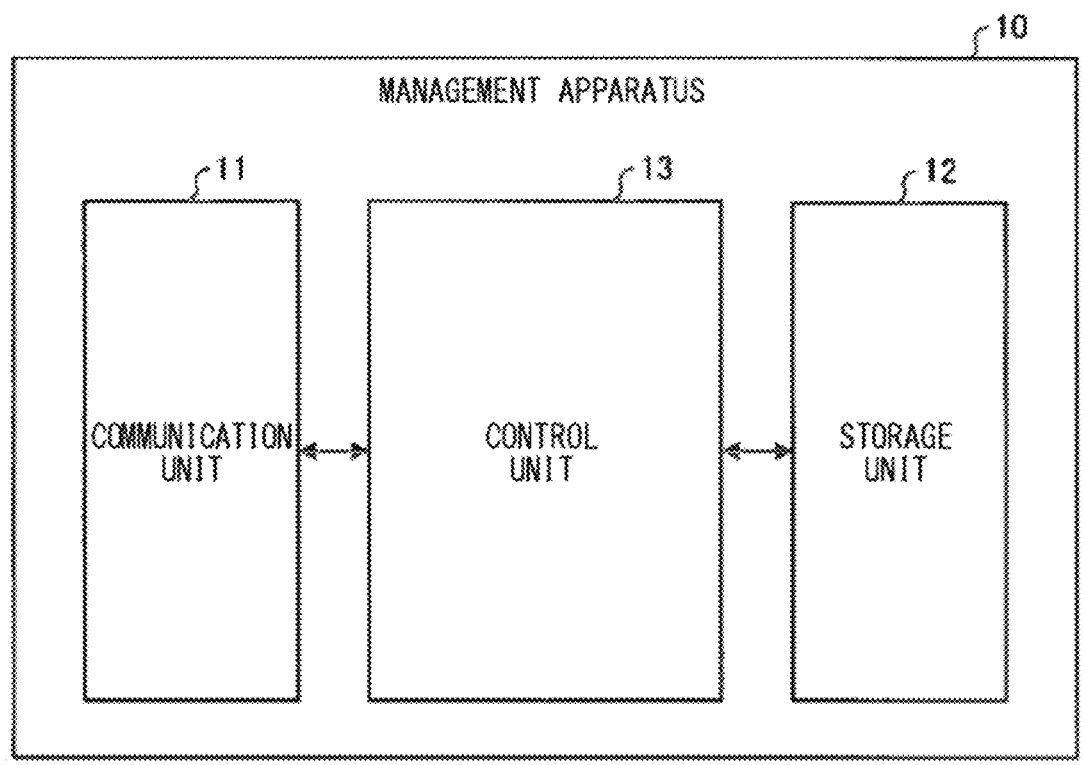
FIG. 3 illustrates a configuration example of a management apparatus according to an embodiment of the present disclosure.

FIG. 3 illustrates a configuration example of the management apparatus 10 according to an embodiment of the present disclosure. The management apparatus 10 includes a communication unit 11, a storage unit 12, and a control unit 13. It is to be noted that the configuration illustrated in FIG. 3 is a functional configuration, and a hardware configuration may be different therefrom. In addition, functions of the management apparatus 10 may be implemented discretely in a plurality of physically separate configurations. For example, the management apparatus 10 may be configured by a plurality of server apparatuses. In addition, among the functions of the management apparatus 10, at least a function of controlling transfer processing from the donor base station to the terminal apparatus via the relay base station or transfer processing from the terminal apparatus to the donor base station via the relay base station may be implemented as the CU in the donor base station.

The communication unit 11 is a communication interface for communicating with another apparatus. The communication unit 11 may be a network interface, or may be an apparatus-connecting interface. For example, the communication unit 11 may be a LAN (Local Area Network) interface such as a NIC (Network Interface Card), or may be a USB (Universal Serial Bus) interface configured by a USB host controller, an USB port, or the like. In addition, the communication unit 11 may be a wired interface, or may be a wireless interface. The communication unit 11 functions as a communication means of the management apparatus 10. The communication unit 11 communicates with the donor base station 20 under the control of the control unit 13.

The storage unit 12 is a data-readable/writable storage device such as a DRAM (Dynamic Random Access Memory), an SRAM (Static Random Access Memory), a flash memory, and a hard disk. The storage unit 12 functions as a storage means of the management apparatus 10. The storage unit 12 stores, for example, a connection status of the terminal apparatus 40. For example, the storage unit 12 stores a status of RRC (Radio Resource Control) and a status of ECM (EPS Connection Management) of the terminal apparatus 40. The storage unit 12 may function as a home memory that stores positional information on the terminal apparatus 40.

The control unit 13 is a controller (controller) that controls each unit of the management apparatus 10. The control unit 13 is achieved by, for example, a processor such as a CPU (Central Processing Unit) and an MPU (Micro Processing Unit). For example, the control unit 13 is achieved by the processor executing various programs stored in the storage device inside the management apparatus 10 using a RAM (Random Access Memory), or the like as a work region. It is to be noted that the control unit 13 may be achieved by an integrated circuit such as an ASIC (Application Specific Integrated Circuit) and an FPGA (Field Programmable Gate Array). All of the CPU, the MPU, the ASIC, and the FPGA may be considered as a controller.

<2-3. Configuration of Donor Base Station>

Figure 4:
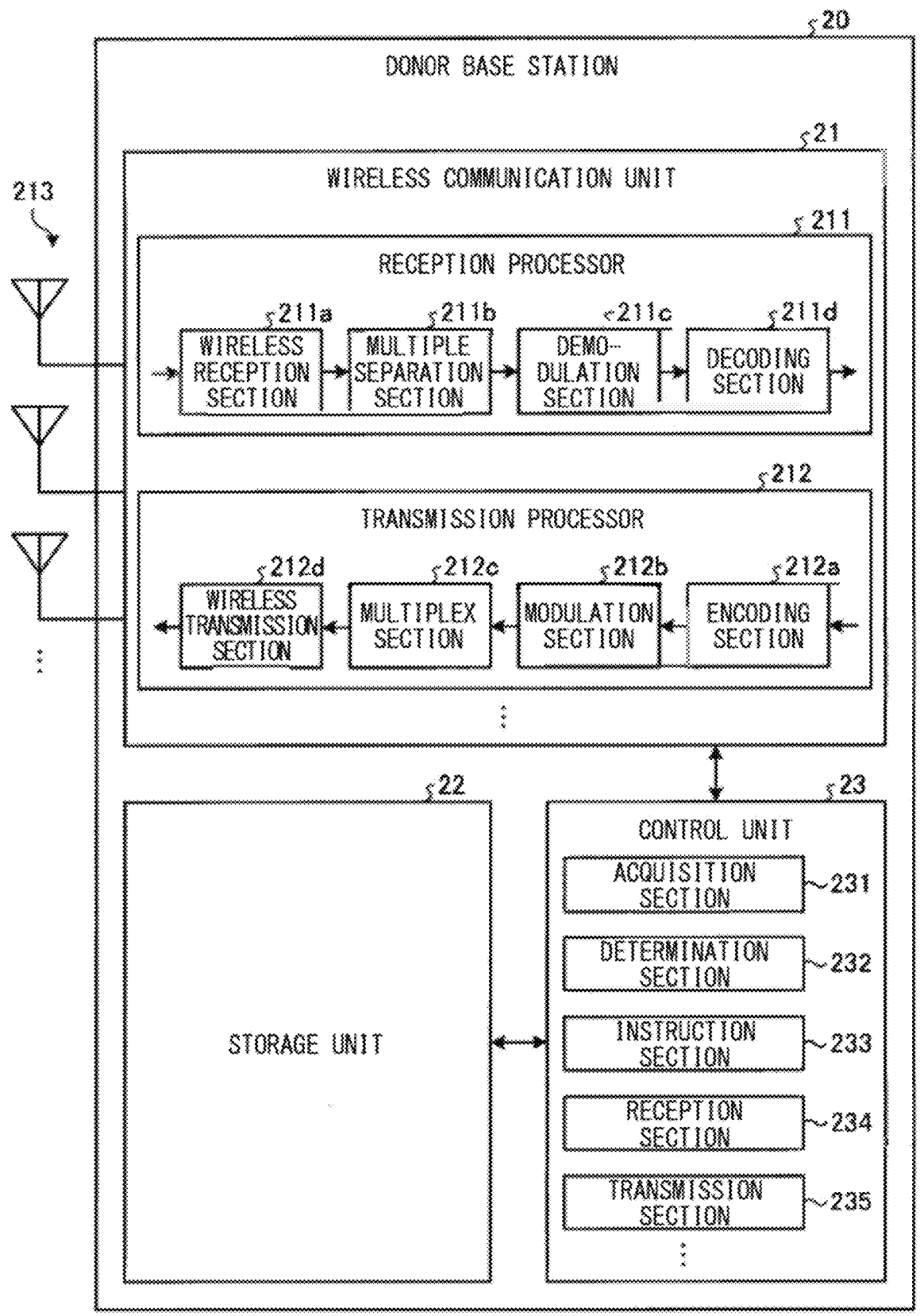
FIG. 4 illustrates a configuration example of a donor base station according to an embodiment of the present disclosure.

Next, description is given of a configuration of the donor base station 20. FIG. 4 illustrates a configuration example of the donor base station 20 according to an embodiment of the present disclosure. The donor base station 20 is able to wirelessly communicate with the relay base station 30, the terminal apparatus 40, and another donor base station 20. At this time, the wireless communication may be communication using a millimeter wave. The donor base station 20 includes a wireless communication unit 21, a storage unit 22, and a control unit 23. It is to be noted that the configuration illustrated in FIG. 4 is a functional configuration, and a hardware configuration may be different therefrom. In addition, functions of the donor base station 20 may be implemented discretely in a plurality of physically separate configurations.

The wireless communication unit 21 is a wireless communication interface that wirelessly communicates with another wireless communication apparatus (e.g., terminal apparatus 40 and relay base station 30). The wireless communication unit 21 operates under the control of the control unit 23. The wireless communication unit 21 corresponds to one or a plurality of radio access systems. For example, the wireless communication unit 21 corresponds to both of the NR and the LTE. The wireless communication unit 21 may correspond to the W-CDMA and the cdma 2000, in addition to the NR and the LTE.

The wireless communication unit 21 includes a reception processor 211, a transmission processor 212, and an antenna 213. The wireless communication unit 21 may include a plurality of reception processors 211, a plurality of transmission processors 212, and a plurality of antennas 213. It is to be noted that, in a case where the wireless communication unit 21 corresponds to the plurality of radio access systems, each part of the wireless communication unit 21 may be individually configured for each radio access system. For example, the reception processor 211 and the transmission processor 212 may be individually configured for the LTE and the NR.

The reception processor 211 performs processing of an uplink signal received via the antenna 213. The reception processor 211 includes a wireless reception section 211a, a multiple separation section 211b, a demodulation section 211c, and a decoding section 211d.

The wireless reception section 211a performs, with respect to an uplink signal, downconversion, removal of unnecessary frequency components, control of amplification levels, quadrature demodulation, conversion to a digital signal, removal of a guard interval, extraction of a frequency region signal by fast Fourier transform, and the like. The multiple separation section 211b separates, from a signal outputted from the wireless reception section 211a, uplink channels such as a PUSCH (Physical Uplink Shared Channel) and a PUCCH (Physical Uplink Control Channel), and uplink reference signals. The demodulation section 211c demodulates a received signal using a modulation system such as BPSK (Binary Phase Shift Keying) or QPSK (Quadrature Phase Shift Keying) on a modulation symbol of the uplink channel. The modulation system used by the demodulation section 211c may be 16 QAM (Quadrature Amplitude Modulation), 64 QAM, or 256 QAM. The decoding section 211d performs decoding processing on encoded bits of the demodulated uplink channel. The decoded uplink data and uplink control information are outputted to the control unit 23.

The transmission processor 212 performs transmission processing of downlink control information and downlink data. The transmission processor 212 includes an encoding section 212a, a modulation section 212b, a multiplex section 212c, and a wireless transmission section 212d.

The encoding section 212a encodes downlink control information and downlink data inputted from the control unit 23 using an encoding system such as block encoding, convolutional encoding, turbo encoding, LDPC (Low-Density Parity Check) encoding, and polar encoding. The modulation section 212b modulates encoded bits outputted from the encoding section 212a using a predetermined modulation system such as the BPSK, the QPSK, the 16 QAM, the 64 QAM, and the 256 QAM. The multiplex section 212c multiplexes modulation symbols of respective channels and downlink reference signals, to be arranged in predetermined resource elements. The wireless transmission section 212d performs various types of signal processing on a signal from the multiplex section 212c. For example, the wireless transmission section 212d performs processing such as conversion to a temporal region by fast Fourier transform, addition of a guard interval, generation of a baseband digital signal, conversion to an analog signal, quadrature modulation, upconversion, removal of extra frequency components, and amplification of power. The signal generated by the transmission processor 212 is transmitted from the antenna 213.

The storage unit 22 is a data-readable/writable storage device such as the DRAM, the SRAM, the flash memory, and the hard disk. The storage unit 22 functions as a storage means of the donor base station 20.

The control unit 23 is a controller (controller) that controls each unit of the donor base station 20. The control unit 23 is achieved by, for example, a processor such as a CPU (Central Processing Unit) and an MPU (Micro Processing Unit). For example, the control unit 23 is achieved by the processor executing various programs stored in the storage device inside the donor base station 20 using a RAM (Random Access Memory), or the like as a work region. It is to be noted that the control unit 23 may be achieved by an integrated circuit such as an ASIC (Application Specific Integrated Circuit) and an FPGA (Field Programmable Gate Array). All of the CPU, the MPU, the ASIC, and the FPGA may be considered as a controller.

As illustrated in FIG. 4, the control unit 23 includes an acquisition section 231, a determination section 232, an instruction section 233, a reception section 234, and a transmission section 235. Respective blocks (acquisition section 231 to transmission section 235) configuring the control unit 23 are functional blocks indicating functions of the control unit 23. These functional blocks may be software blocks, or may be hardware blocks. For example, each of the above-described functional blocks may be one software module achieved by software (including a microprogram), or may be one circuit block on a semiconductor chip (die). The functional blocks may each be one processor or one integrated circuit, as a matter of course. The method for configuring the functional blocks is arbitrary. It is to be noted that the control unit 23 may be configured by functional units different from the functional blocks described above. The operation of each of the blocks (acquisition section 231 to transmission section 235) configuring the control unit 23 is described in detail below in the description of handover processing, and the like.

<2-4. Configuration of Relay Base Station>

Figure 5:
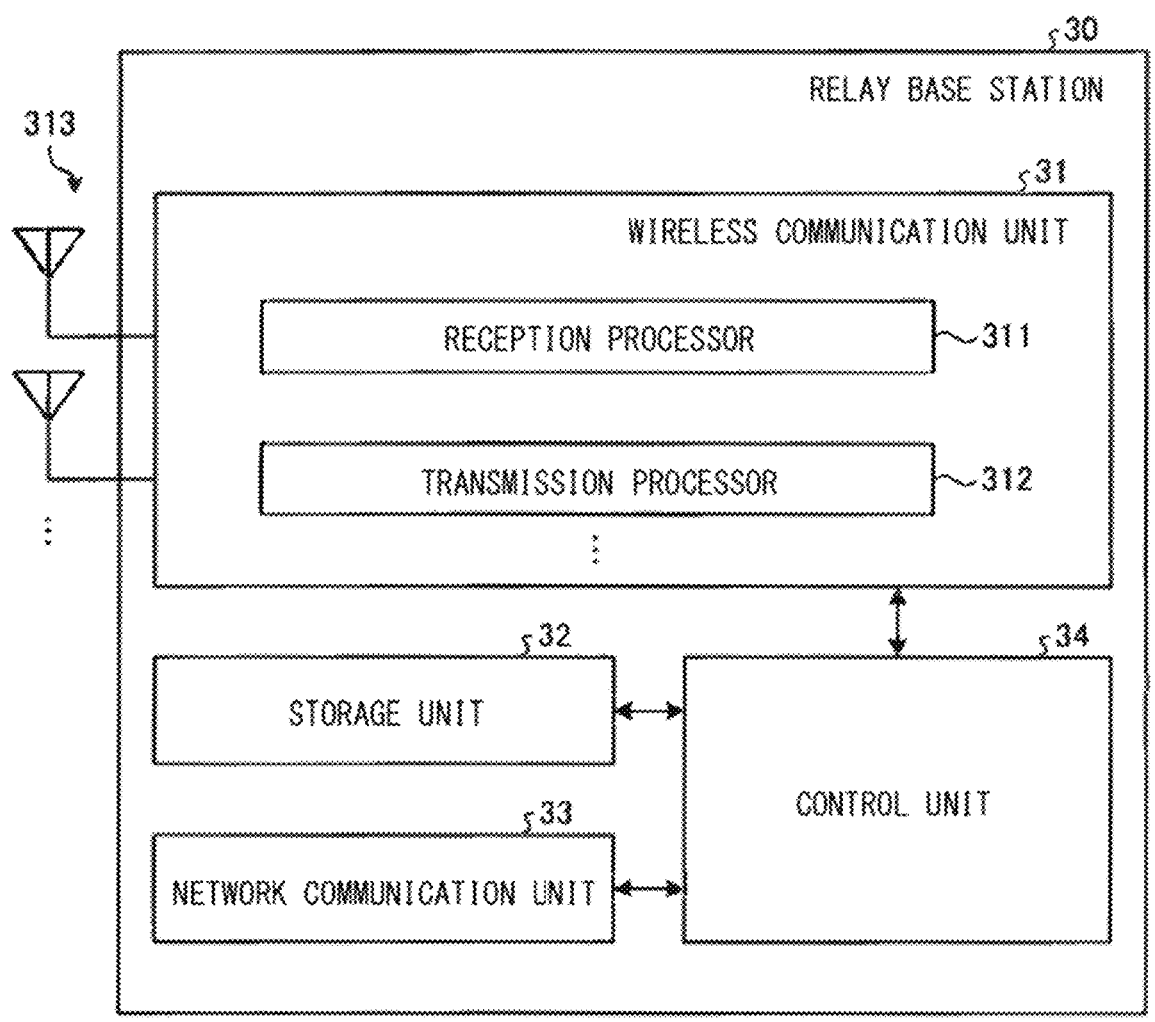
FIG. 5 illustrates a configuration example of a relay base station according to an embodiment of the present disclosure.

Next, description is given of a configuration of the relay base station 30. FIG. 5 illustrates a configuration example of the relay base station 30 according to an embodiment of the present disclosure. The relay base station 30 is able to wirelessly communicate with the terminal apparatus 40. At this time, the wireless communication may be communication using a millimeter wave. The relay base station 30 includes a wireless communication unit 31, a storage unit 32, a network communication unit 33, and a control unit 34. It is to be noted that the configuration illustrated in FIG. 5 is a functional configuration, and a hardware configuration may be different therefrom. In addition, the functions of the relay base station 30 may be implemented discretely in a plurality of physically separate configurations.

The wireless communication unit 31 is a wireless communication interface that wirelessly communicates with another wireless communication apparatus (e.g., donor base station 20 and terminal apparatus 40). The wireless communication unit 31 operates under the control of the control unit 34. The wireless communication unit 31 includes a reception processor 311, a transmission processor 312, and an antenna 313. The configurations of the wireless communication unit 31, the reception processor 311, the transmission processor 312, and the antenna 313 are similar to those of the wireless communication unit 21, the reception processor 211, the transmission processor 212, and the antenna 213 of the donor base station 20.

The storage unit 32 is a data-readable/writable storage device such as the DRAM, the SRAM, the flash memory, and the hard disk. The storage unit 32 functions as a storage means of the relay base station 30. The configuration of the storage unit 32 is similar to that of the storage unit 22 of the donor base station 20.

The network communication unit 33 is a communication interface for communicating with another apparatus. For example, the network communication unit 33 is a LAN interface such as the NIC. The network communication unit 33 may be a wired interface, or may be a wireless interface. The network communication unit 33 functions as a network communication means of the relay base station 30. The network communication unit 33 communicates with the donor base station 20 under the control of the control unit 34.

The control unit 34 is a controller that controls each unit of the relay base station 30. The configuration of the control unit 34 is similar to that of the control unit 23 of the donor base station 20.

<2-5. Configuration of Terminal Apparatus>

Figure 6:
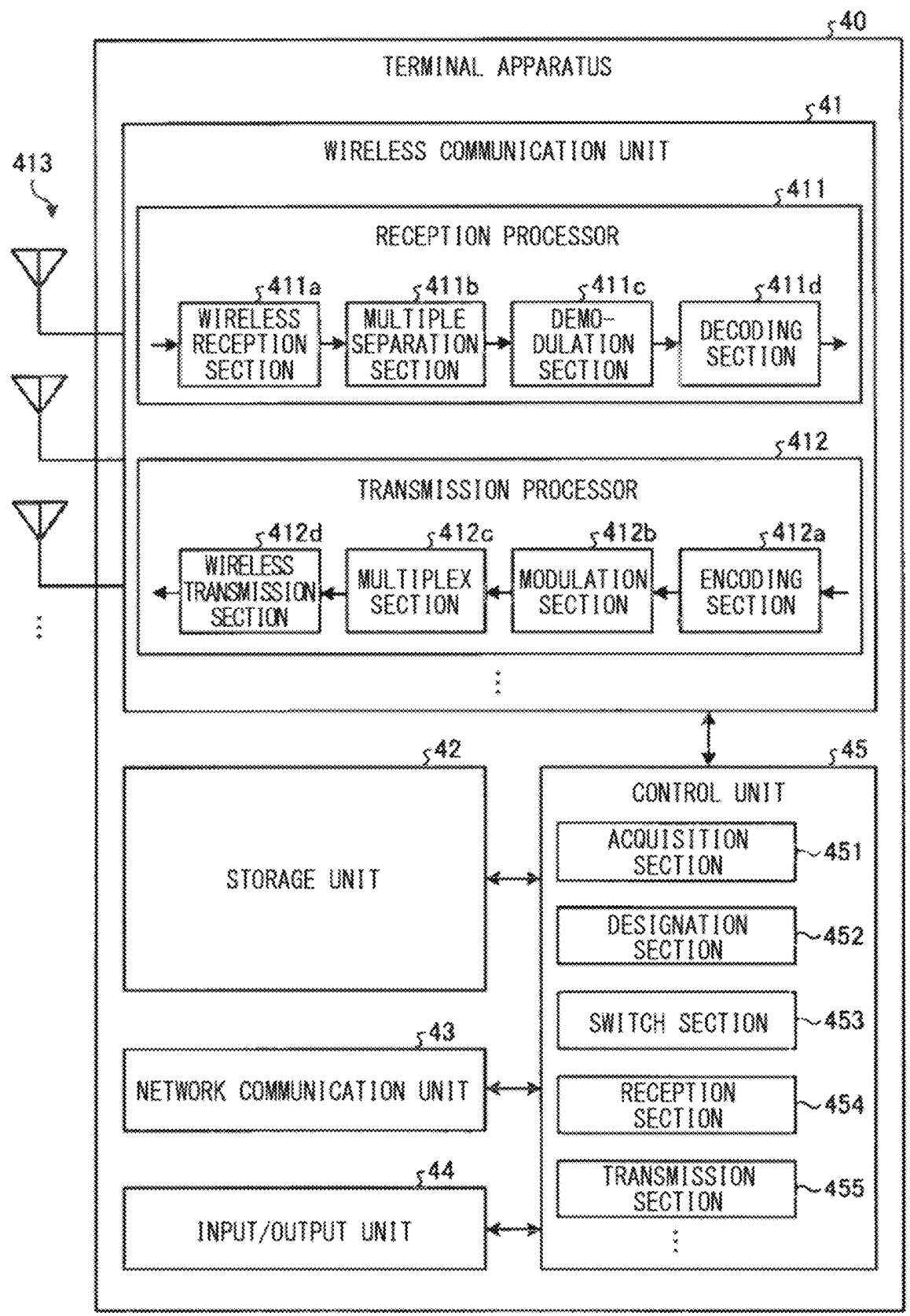
FIG. 6 illustrates a configuration example of a terminal apparatus according to an embodiment of the present disclosure.

Next, description is given of a configuration of the terminal apparatus 40. FIG. 6 illustrates a configuration example of the terminal apparatus 40 according to an embodiment of the present disclosure. The terminal apparatus 40 is able to wirelessly communicate with the donor base station 20 and the relay base station 30. At this time, the wireless communication may be communication using a millimeter wave. The terminal apparatus 40 includes a wireless communication unit 41, a storage unit 42, a network communication unit 43, an input/output unit 44, and a control unit 45. It is to be noted that the configuration illustrated in FIG. 6 is a functional configuration, and a hardware configuration may be different therefrom. In addition, the functions of the terminal apparatus 40 may be implemented discretely in a plurality of physically separate configurations.

The wireless communication unit 41 is a wireless communication interface that wirelessly communicates with another wireless communication apparatus (e.g., donor base station 20 and relay base station 30). The wireless communication unit 41 operates under the control of the control unit 45. The wireless communication unit 41 corresponds to one or a plurality of radio access systems. For example, the wireless communication unit 41 corresponds to both of the NR and the LTE. The wireless communication unit 41 may correspond to the W-CDMA and the cdma 2000, in addition to the NR and the LTE.

The wireless communication unit 41 includes a reception processor 411, a transmission processor 412, and an antenna 413. The wireless communication unit 41 may include a plurality of reception processors 411, a plurality of transmission processors 412, and a plurality of antennas 413. It is to be noted that, in a case where the wireless communication unit 41 corresponds to the plurality of radio access systems, each part of the wireless communication unit 41 may be individually configured for each radio access system. For example, the reception processor 411 and the transmission processor 412 may be individually configured for the LTE and the NR.

The reception processor 411 performs processing of a downlink signal received via the antenna 413. The reception processor 411 includes a wireless reception section 411a, a multiple separation section 411b, a demodulation section 411c, and a decoding section 411d.

The wireless reception section 411a performs, with respect to a downlink signal, downconversion, removal of unnecessary frequency components, control of amplification levels, quadrature demodulation, conversion to a digital signal, removal of a guard interval, extraction of a frequency region signal by fast Fourier transform, and the like. The multiple separation section 411b separates, from a signal outputted from the wireless reception section 411a, downlink channels, downlink synchronization signals, and downlink reference signals. The downlink channels are, for example, channels such as a PBCH (Physical Broadcast Channel), a PDSCH (Physical Downlink Shared Channel), and a PDCCH (Physical Downlink Control Channel). The demodulation section 211c demodulates a received signal using a modulation system such as the BPSK, the QPSK, the 16 QAM, the 64 QAM, and the 256 QAM on a modulation symbol of the downlink channel. The decoding section 411d performs decoding processing on encoded bits of the demodulated downlink channel. The decoded downlink data and downlink control information are outputted to the control unit 23.

The transmission processor 412 performs transmission processing of uplink control information and uplink data. The transmission processor 412 includes an encoding section 412a, a modulation section 412b, a multiplex section 412c, and a wireless transmission section 412d.

The encoding section 412a encodes uplink control information and uplink data inputted from the control unit 45 using an encoding system such as block encoding, convolutional encoding, turbo encoding, LDPC (Low-Density Parity Check) encoding, and polar encoding. The modulation section 412b modulates encoded bits outputted from the encoding section 412a using a predetermined modulation system such as the BPSK, the QPSK, the 16 QAM, the 64 QAM, and the 256 QAM. The multiplex section 412c multiplexes modulation symbols of respective channels and uplink reference signals, to be arranged in predetermined resource elements. The wireless transmission section 412d performs various types of signal processing on a signal from the multiplex section 412c. For example, the wireless transmission section 412d performs processing such as conversion to a temporal region by inverse fast Fourier transform, addition of a guard interval, generation of a baseband digital signal, conversion to an analog signal, quadrature modulation, upconversion, removal of extra frequency components, and amplification of power. The signal generated by the transmission processor 412 is transmitted from the antenna 413.

The storage unit 42 is a data-readable/writable storage device such as the DRAM, the SRAM, the flash memory, and the hard disk. The storage unit 42 functions as a storage means of the terminal apparatus 40.

The network communication unit 43 is a communication interface for communicating with another apparatus. For example, the network communication unit 43 is a LAN interface such as the NIC. The network communication unit 43 may be a wired interface, or may be a wireless interface. The network communication unit 43 functions as a network communication means of the terminal apparatus 40. The network communication unit 43 communicates with another apparatus under the control of the control unit 45.

The input/output unit 44 is a user interface for exchanging information with a user. For example, the input/output unit 44 is an operation device for a user to perform various operations on a keyboard, a mouse, operation keys, a touch panel, and the like. Alternatively, the input/output unit 44 is a display device such as a liquid crystal display (Liquid Crystal Display) and an organic EL display (Organic Electroluminescence Display). The input/output unit 44 may be an acoustics device such as a speaker and a buzzer. In addition, the input/output unit 44 may be a lighting device such as an LED (Light Emitting Diode) lamp. The input/output unit 44 functions as input/output means (input means, output means, operation means, or notification means) of the terminal apparatus 40.

The control unit 45 is a controller that controls each unit of the terminal apparatus 40. The control unit 45 is achieved by, for example, a processor such as a CPU and an MPU. For example, the control unit 45 is achieved by the processor executing various programs stored in the storage device inside the terminal apparatus 40 using a RAM, or the like as a work region. It is to be noted that the control unit 45 may be achieved by an integrated circuit such as an ASIC and a FPGA. All of the CPU, the MPU, the ASIC, and the FPGA may be considered as a controller.

As illustrated in FIG. 6, the control unit 45 includes an acquisition section 451, a designation section 452, a switch section 453, a reception section 454, and a transmission section 455. Respective blocks (acquisition section 451 to transmission section 455) configuring the control unit 45 are functional blocks indicating functions of the control unit 45. These functional blocks may be software blocks, or may be hardware blocks. For example, each of the above-described functional blocks may be one software module achieved by software (including a microprogram), or may be one circuit block on a semiconductor chip (die). The functional blocks may each be one processor or one integrated circuit, as a matter of course. The method for configuring the functional blocks is arbitrary. It is to be noted that the control unit 45 may be configured by functional units different from the functional blocks described above. The operation of each of the blocks (acquisition section 451 to transmission section 455) configuring the control unit 45 is described in detail below in the description of connection processing, handover processing, and the like.

3. PATH SELECTION EXAMPLES

Next, description is given of examples of selection of a path between the donor base station 20 and the terminal apparatus 40.

<3-1. Basic Path Selection Example>

Figure 7:
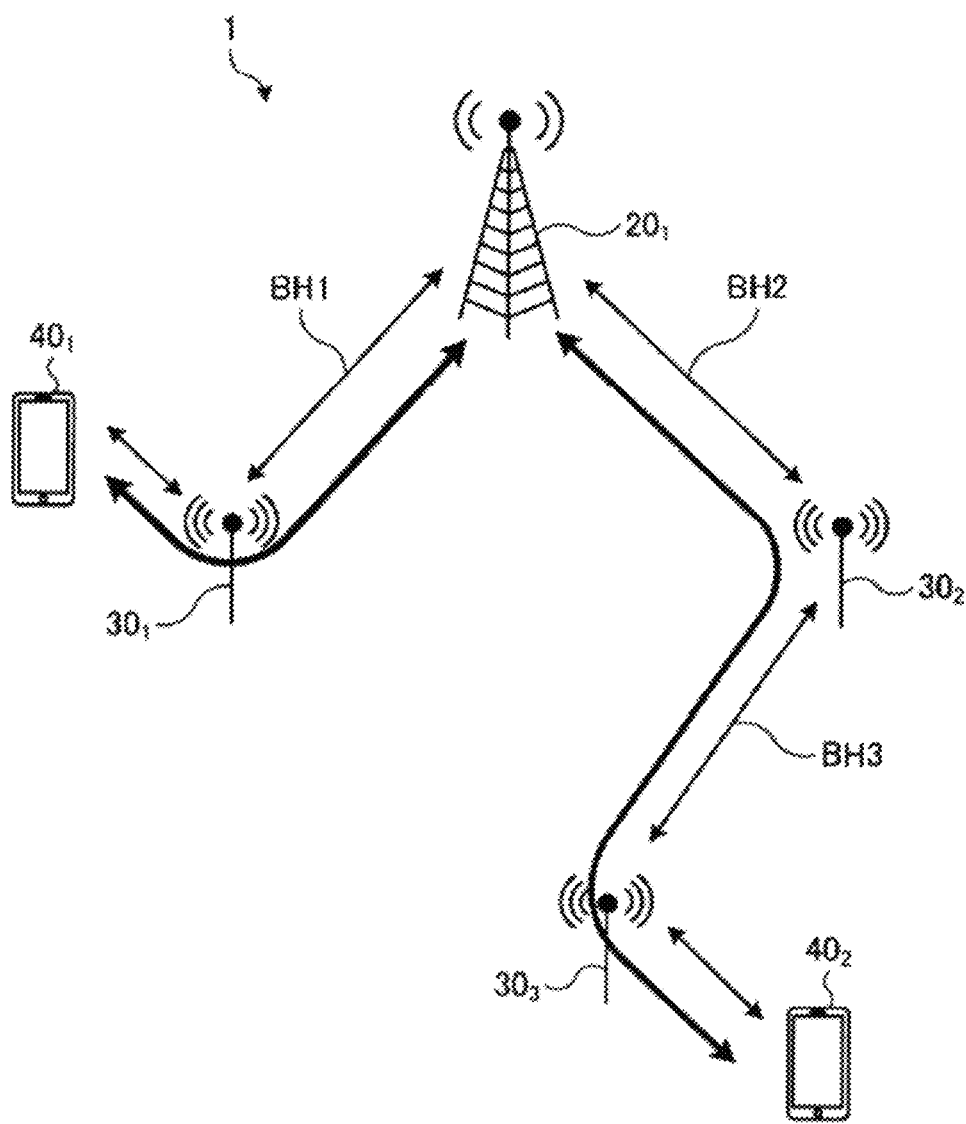
FIG. 7 illustrates an example of selection of a path between a donor base station and terminal apparatuses.

FIG. 7 illustrates an example of selection of a path between the donor base station 20 and the terminal apparatuses 40. Specifically, FIG. 7 illustrates an example of path selection for two terminal apparatuses: the terminal apparatus 40$_1$ and the terminal apparatus 40$_2$. The terminal apparatus 40$_1$ communicates via an access line of the relay base station 30$_1$. The relay base station 30$_1$ has the backhaul line BH1 with respect to the donor base station 20$_1$. In addition, the terminal apparatus 40$_2$ communicates via an access line of the relay base station 30$_3$. The relay base station 30$_3$ has the backhaul line BH3 with respect to the relay base station 30$_2$, and the relay base station 30$_2$ further has the backhaul line BH2 with respect to the donor base station 20$_1$. In the example of FIG. 7, the relay base station 30$_1$ has a one-hop backhaul line, and the relay base station 30$_3$ has a two-hop backhaul line.

<3-2. Path Selection Example in a Case of Deterioration in Communication Quality>

An IAB backhaul line is expected to utilize a millimeter wave and beamforming in order to exchange a large amount of data. In the future, a moveable IAB relay station is also planned to be discussed; however, at the initial stage of introduction, the IAB relay station would mostly be fixedly installed, and thus application of the beamforming is considered to be relatively easy. However, there is a concern about the millimeter wave that an external factor, e.g., blocking due to a mobile object, etc. may cause frequent occurrence of deterioration in communication quality. Therefore, a mechanism of quick optimum path selection and switching is considered to be important.

Figure 8A:
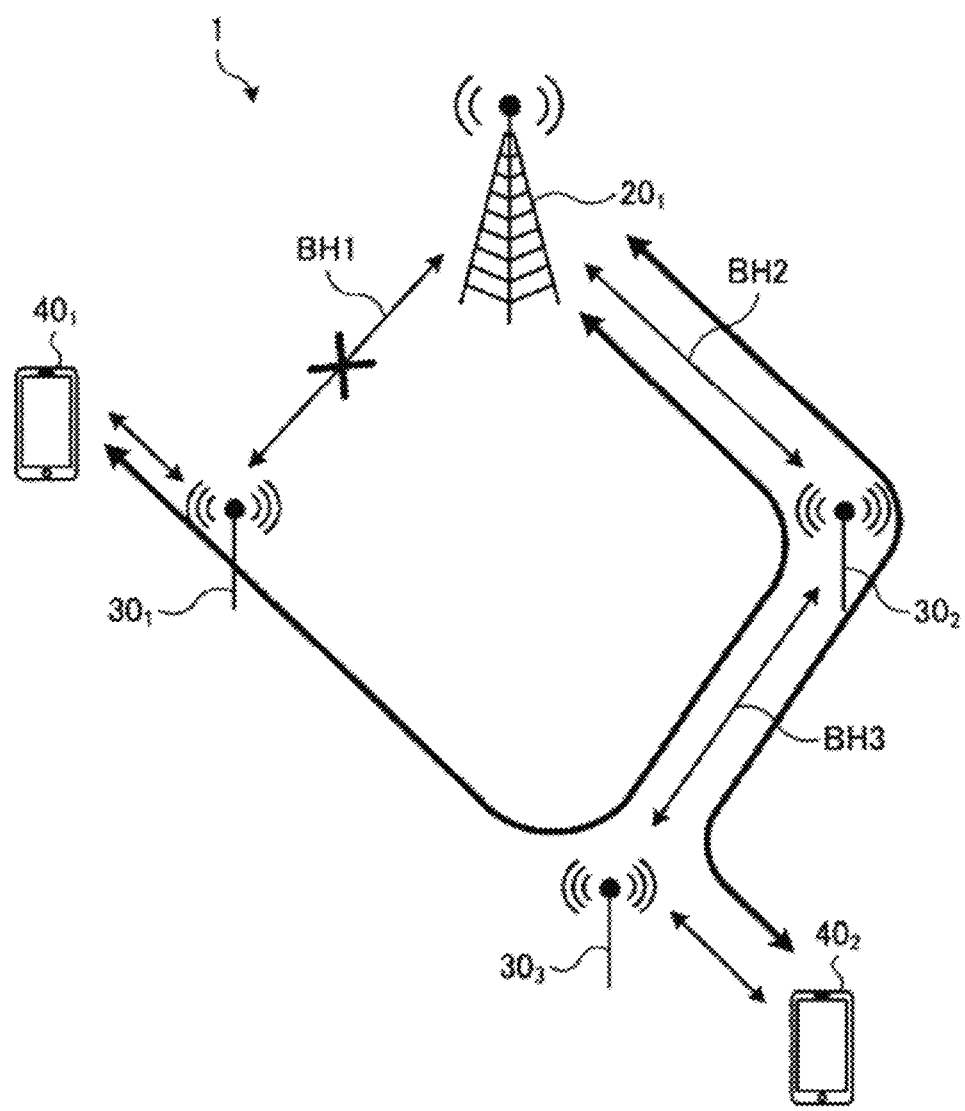
FIG. 8A illustrates a path selection example in a case where communication quality of a portion of the backhaul line illustrated in FIG. 7 is deteriorated.

FIG. 8A illustrates a path selection example in a case where communication quality of a portion of the backhaul line illustrated in FIG. 7 is deteriorated. For example, suppose that communication quality of the backhaul line BH1 is deteriorated as in the example of FIG. 8A. In this case, the relay base station 30$_1$ constructs a backhaul line BH4 with respect to the relay base station 30$_3$. This enables the terminal apparatus 40$_1$ to be connected to the donor base station 20$_1$ via a three-hop backhaul line of the BH2, the BH3, and the BH4, while maintaining the access line of the relay base station 30$_1$.

Figure 8B:
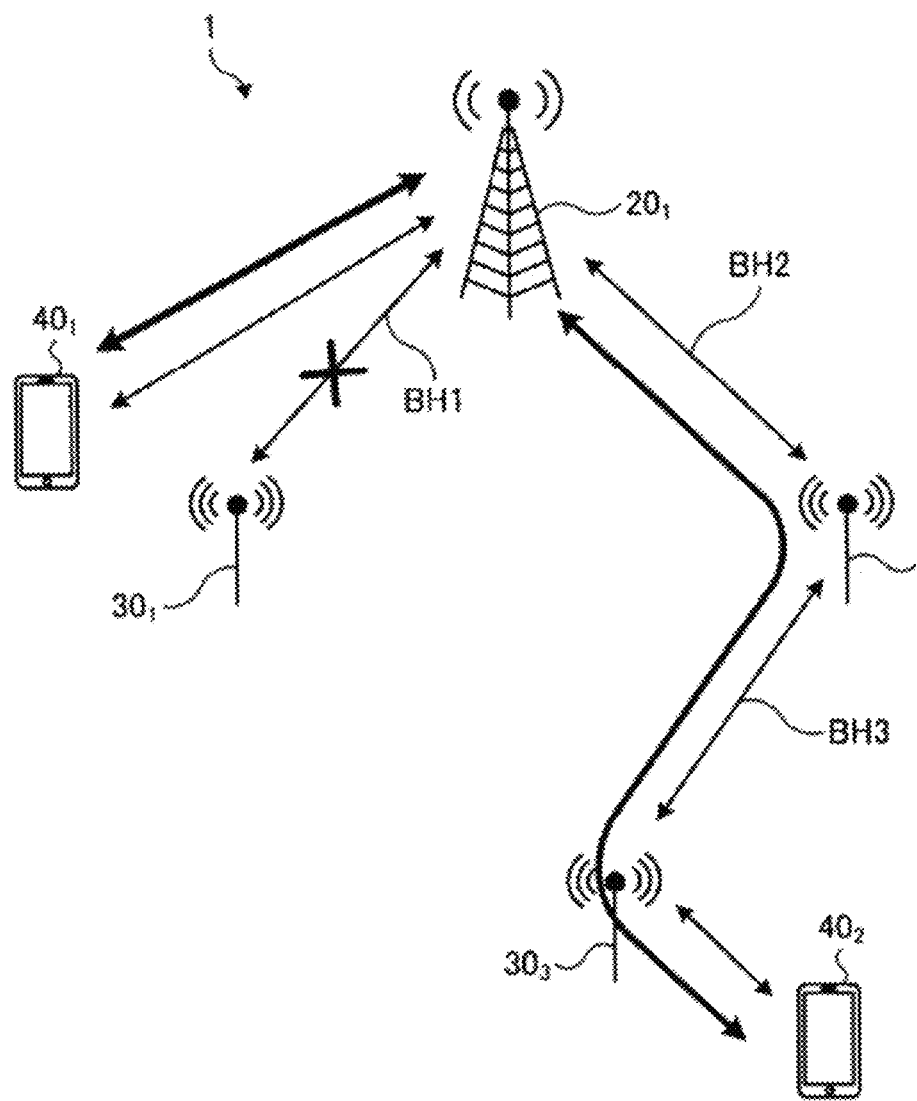
FIG. 8B illustrates another path selection example in the case where the communication quality of a portion of the backhaul line illustrated in FIG. 7 is deteriorated.

The terminal apparatus 40$_1$ is also able to construct an access line with respect to the donor base station 20$_1$, while abandoning the access line of the relay base station 30$_1$. FIG. 8B illustrates another path selection example in the case where the communication quality of a portion of the backhaul line illustrated in FIG. 7 is deteriorated. Here, as in the case of FIG. 8B, the terminal apparatus 40$_1$ is able to determine whether to maintain connection with the relay base station 30$_1$ or to construct a new connection with the donor base station 20$_1$. However, the terminal apparatus 40$_1$ is not able to determine to construct a new backhaul line between the relay base station 30$_1$ and the relay base station 30$_3$ as in the case of FIG. 8A, and thus it is considered to be necessary for at least network side, e.g., the donor base station 20$_1$ to be involved with selection of an optimum path. For example, the selection of an optimum path or management thereof may be performed by a node called the CU (Central Unit). The CU may be reworded as the communication control apparatus.

It is to be noted that, in the example of FIG. 7, in a case of detecting Radio Link Failure (RLF) for the BH1, the relay base station 30$_1$ instructs the terminal apparatus 40$_1$ on Connection Release. In addition, in a case where the relay base station 30$_2$ detects RLF for the BH2, the relay base station 30$_2$ instructs the relay base station 30$_3$ and the terminal apparatus 40$_2$ on Connection Release. Here, in a case of providing access lines to a plurality of terminal apparatuses 40 via the relay base station 30$_2$, the relay base station 30$_3$ may simultaneously instruct the plurality of terminal apparatuses 40 that utilize a path via the relay base station 30$_2$ on Connection Release by means of Broadcast or Groupcast. Further, relay base stations (relay base stations 30$_1$, 30$_2$, and 30$_3$ in this example) having lost all of the backhaul lines may execute Admission Control until reconstruction of the backhaul line. That is, the relay base stations 30$_1$, 30$_2$, and 30$_3$ reject a connection request from the terminal apparatus 40 or a different relay base station in this period. In addition, in this period, the relay base stations 30$_1$, 30$_2$, and 30$_3$ may notify, as Access Control information, information including Access Class Barring set via system information to thereby suppress the connection request from the terminal apparatus 40 or the different relay base station. It is to be noted that an inside timer period may be set, as the period until the reconstruction of the backhaul line, to initiate the timer when the RLF is detected. In addition, the instruction to perform Connection Release described above may be given after expiration of the timer. A parameter of Access Class Barring described above may be set on the basis of the timer period. Then, the terminal apparatus 40 having executed Connection Release newly designates a base station supporting a desired network slice to execute connection processing in the method described later.

It is to be noted that the CU may be disposed in the donor base station 20, or may be implemented in any apparatus inside the core network. For example, the CU may be the control unit 23 included in the donor base station 20, or may be the control unit 13 included in the management apparatus 10. It is to be noted that, when the donor base station 20 and the management apparatus 10 are each configured by a plurality of apparatuses, one or a plurality of apparatuses thereof may function as the CU. In addition, the relay base station 30 or the terminal apparatus 40 may have the function as the CU.

<3-3. Path Selection Example Depending on Service Utilized by Terminal Apparatus>

Achievement of a concept of network slicing is the key to the 5G. That is, it is assumed that the terminal apparatus 40 appropriately receives, for example, communication services having different characteristics such as high throughput or low delay. For example, in a case where the terminal apparatus $40_1$ receives a service requiring low delay, selection of a path with a large number of hops as in the example of FIG. 8A may possibly result in not satisfying the requirement of low delay. That is, the CU is desired to select an optimum path depending on the service utilized by the terminal apparatus 40. In this case, it is desired that the CU initiate measurement reporting on the backhaul line and handover, prior to construction of the optimum path.

Here, determination of the type of the service may be made on the basis of identification information on the network slice, e.g., a slice ID (Slice ID). For example, in a case where the terminal apparatus $40_1$ receives a service requiring low delay, e.g., URLLC (Ultra-Reliable Low Latency Communication), the CU may select a path via a backhaul line with a small number of hops as in FIG. 8B, depending on a slice ID corresponding to the low-delay service.

In addition, in a case where the terminal apparatus 40 receives a service requiring high throughput, e.g., eMBB (enhanced Mobile Broadband), the CU may select, for example, a path including a base station near the terminal apparatus $40_1$ as illustrated in FIG. 8B, depending on a slice ID corresponding to high throughput. It is to be noted that, in a case where the terminal apparatus $40_1$ receives the eMBB, the CU may switch paths by monitoring loads on respective relay base stations 30 and dynamically selecting a path that passes through a less loaded relay base station 30.

In addition, in a case where the terminal apparatus 40 receives mMTC (massive Machine Type Communication), due to insensitiveness to delay, the CU may select a backhaul line to distribute traffic of each MTC, for example, in consideration of a path assigned to another MTC. However, in a case of MTC for use applications such as LPWA (Low Power Wide Area) sensitive to power consumption, a path may be considered, which passes through a nearby relay base station 30, for the access network.

Here, the slice ID may be, for example, S-NSSAI (Single Network Slice Selection Assistance Information). The S-NSSAI is configured by SST (Slice/Service type). In addition, the S-NSSAI may be configured by the SST and SD (Slice Differentiator).

It is to be noted that determination of the type of the service may be made on the basis of another preset standard other than the slice ID. The slice ID may be regarded as information indicating a communication mode of the communication service to be received by the terminal apparatus 40 (e.g., whether the communication service to be received by the terminal apparatus 40 is the uRLLC, the eMBB, or the mMTC) using the wireless network of the communication system 1. In addition, the determination of the type of the service may be made on the basis of capability (e.g., UE Capability) of the terminal apparatus 40.

<3-4. Path Selection Example in a Case Where Terminal Apparatus Receives a Plurality of Services>

Figure 9A:
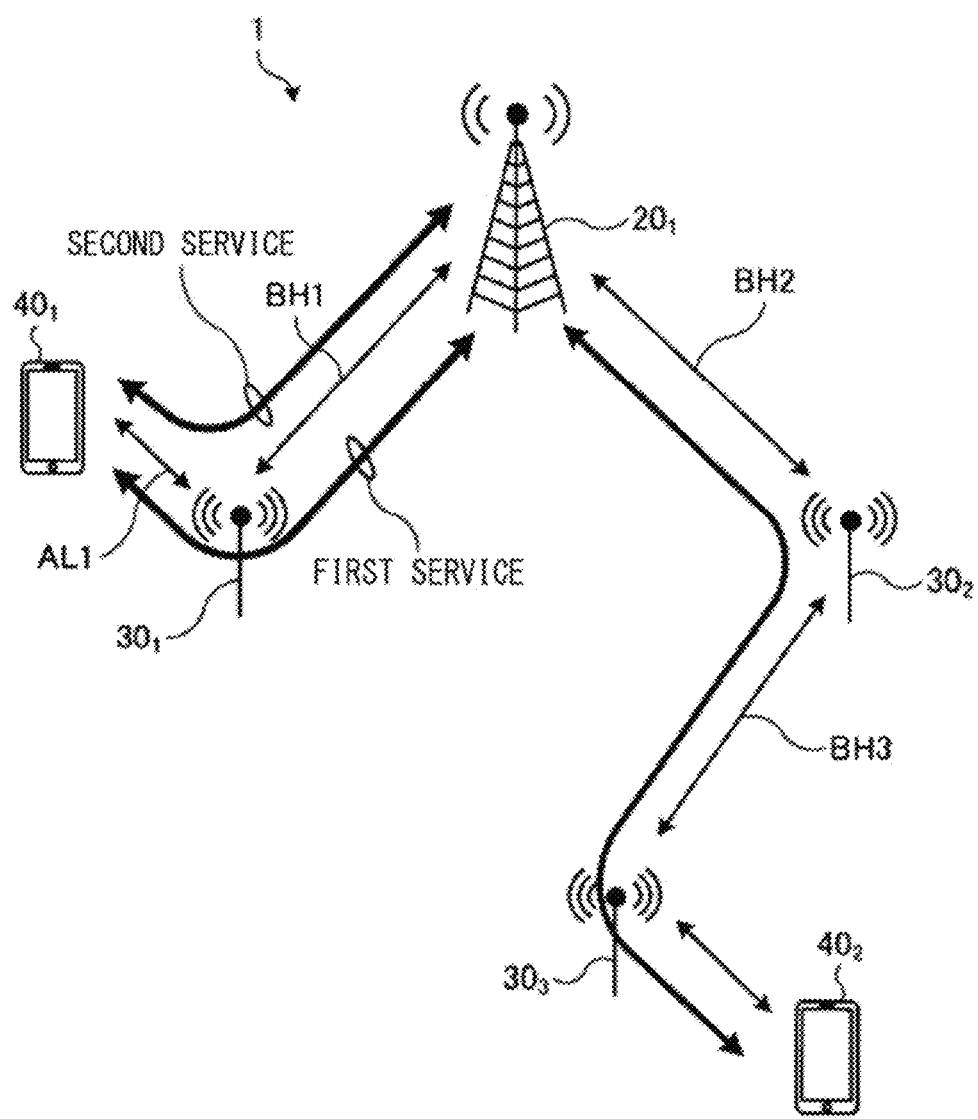
FIG. 9A illustrates a path selection example in a case where the terminal apparatus has received a plurality of services simultaneously.

A case is also assumed where the terminal apparatus 40 receives a plurality of service simultaneously. For example, a case is also assumed where the terminal apparatus 40 receives a plurality of communication services belonging to different slice IDs simultaneously. FIG. 9A illustrates a path selection example in a case where the terminal apparatus $40_1$ has received the plurality of services simultaneously. In the example of FIG. 9A, the terminal apparatus $40_1$ simultaneously receive two services (a first service and a second service) with different slice IDs.

In a case where quality of the backhaul line BH1 is deteriorated, the CU gives an instruction to construct a backhaul line between the relay base station $30_1$ and the relay base station $30_3$, as illustrated in FIG. 8A or 8B. Here, the CU designates an optimum path through which data is exchanged between the donor base station $20_1$ and the terminal apparatus $40_1$ for each slice ID.

Figure 9B:
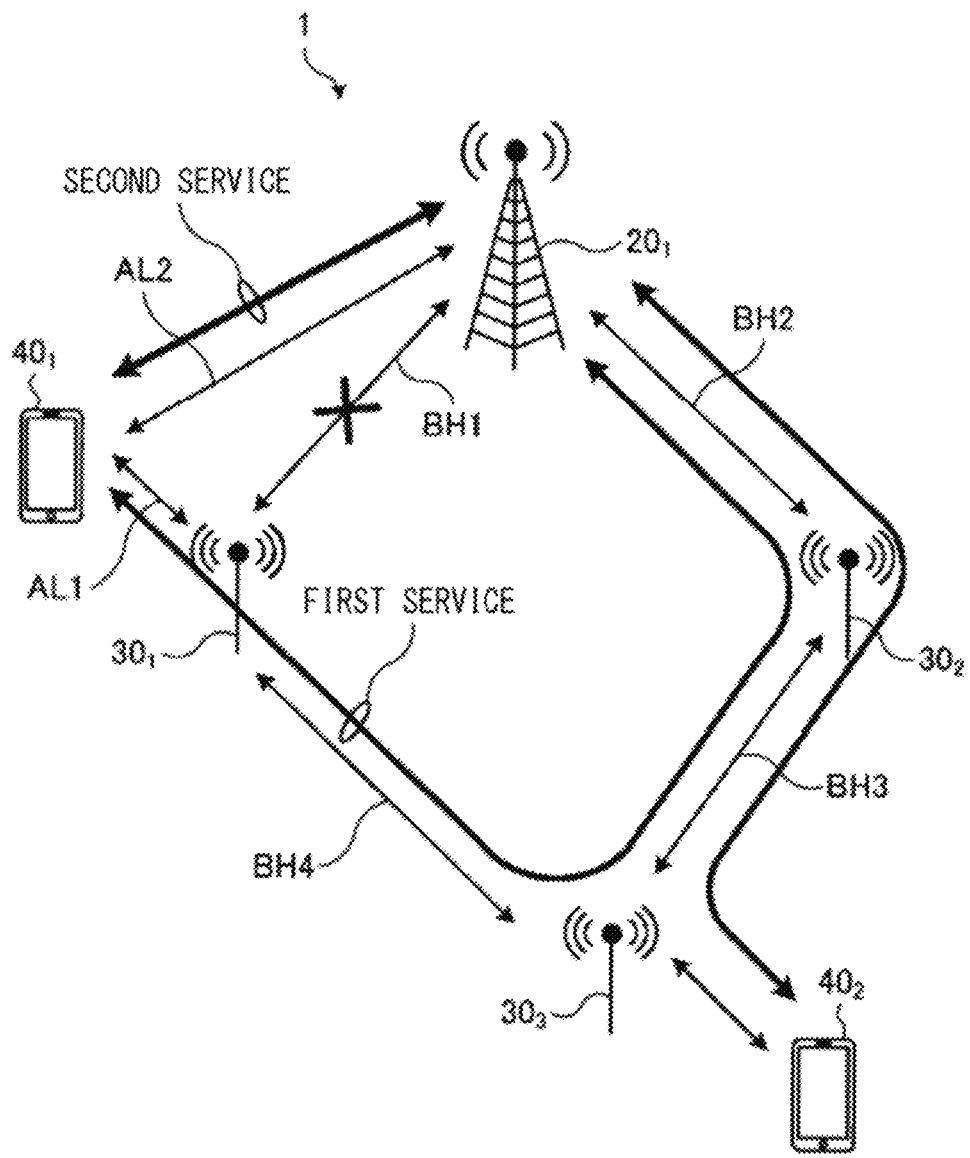
FIG. 9B illustrates a path selection example in a case where communication quality of a portion of the backhaul line illustrated in FIG. 9A is deteriorated.

FIG. 9B illustrates a path selection example in a case where communication quality of a portion of the backhaul line illustrated in FIG. 9A is deteriorated. For example, suppose that communication quality of the backhaul line BH1 linking the relay base station $30_1$ and the donor base station $20_1$ to each other is deteriorated. In a case where the first service is, for example, a service such as the eMBB, the CU designates, for example, a path including a base station near the terminal apparatus $40_1$ as illustrated in FIG. 9B for the first service. In this case, the access line utilized by the terminal apparatus $40_1$ remains to be an access line AL1 without any change, and thus the connection with the relay base station $30_1$ is maintained.

Meanwhile, in a case where the second service is a service such as the URLLC, the CU designates, for example, a path that passes through a backhaul line with a small number of hops as illustrated in FIG. 9B the for the second service. Therefore, for example, the CU instructs the terminal apparatus $40_1$ to perform handover to the donor base station $20_1$ to utilize an access line AL2 of the donor base station $20_1$. That is, depending on the slice ID, the handover of the terminal apparatus $40_1$ may be initiated by the deterioration of the quality of the backhaul line, as a trigger, regardless of the quality of the access line of the terminal apparatus $40_1$.

Here, the CU needs to be reported from the terminal apparatus $40_1$ about information on whether or not the terminal apparatus $40_1$ has a capability of connection to different relay base stations 30 simultaneously, e.g., the number of transmitters/receivers. For example, it is possible to provide information concerning this capability (e.g., UE Capability) as a portion of the NSSAI (Network Slice Selection Assistance Information) via arbitrary message (e.g., Message 3) to be transmitted to the CU in initial access processing.

4. OPERATION OF COMMUNICATION SYSTEM

Next, description is given of an operation of the communication system 1.

Figure 10:
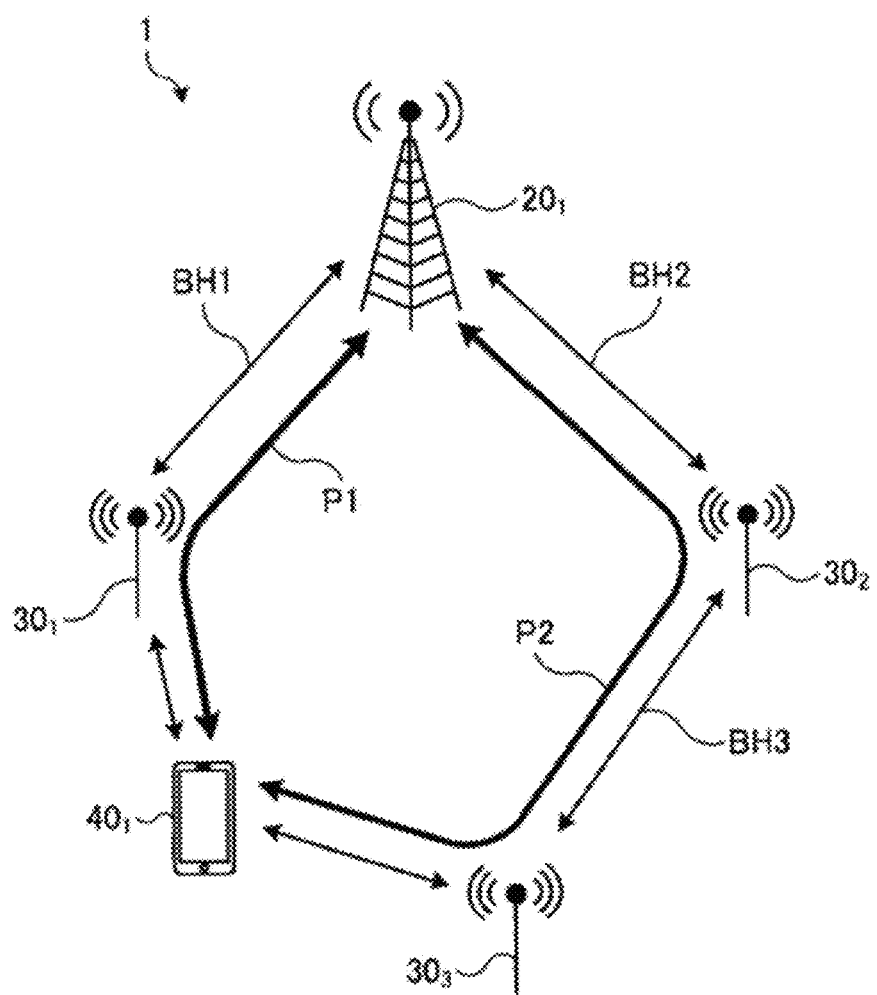
FIG. 10 illustrates an example of a connected state between the terminal apparatus and the donor base station.

It is to be noted that the following description describes the operation of the communication system 1 by exemplifying a connection between the terminal apparatus $40_1$ and the donor base station $20_1$. Here, suppose that the terminal apparatus $40_1$ and the donor base station $20_1$ are in a connected state as illustrated in FIG. 10. FIG. 10 illustrates an example of the connected state between the terminal apparatus $40_1$ and the donor base station $20_1$. The terminal apparatus $40_1$ is connected to the donor base station $20_1$ by a path P1 via the backhaul line BH1. Here, the backhaul line BH1 is a line that connects the relay base station $30_1$ and the donor base station $20_1$ to each other. In addition, a path P2 illustrated in FIG. 10 is a path that connects the terminal apparatus $40_1$ and the donor base station $20_1$ to each other via the backhaul lines BH2 and BH3. Here, the backhaul line BH2 is a line that connects the relay base station $30_2$ and the donor base station $20_1$ to each other, and the backhaul line BH3 is a line that connects the relay base station $30_3$ and the relay base station $30_2$ to each other.

In addition, in the following description, it is assumed that the CU is the donor base station $20_1$, but the CU may be another apparatus included in the communication system 1. In this case, the description of the donor base station $20_1$ (or description of the donor base station 20) given below is replaced by another apparatus appropriately.

In addition, it is assumed that the service to be received by the terminal apparatus 40 includes a plurality of communication services with different communication modes. Here, the plurality of communication services includes at least two communication services selected from the mMTC, the eMBB, and the URLLC. The plurality of communication services may include a communication service other than the mMTC, the eMBB and the URLLC. In the following description, it is assumed that the terminal apparatus 40 is able to receive at least two communication services simultaneously.

<4-1. Connection Processing in a Case Where There is No Network Slice Information from Nearby Base Station>

Figure 11:
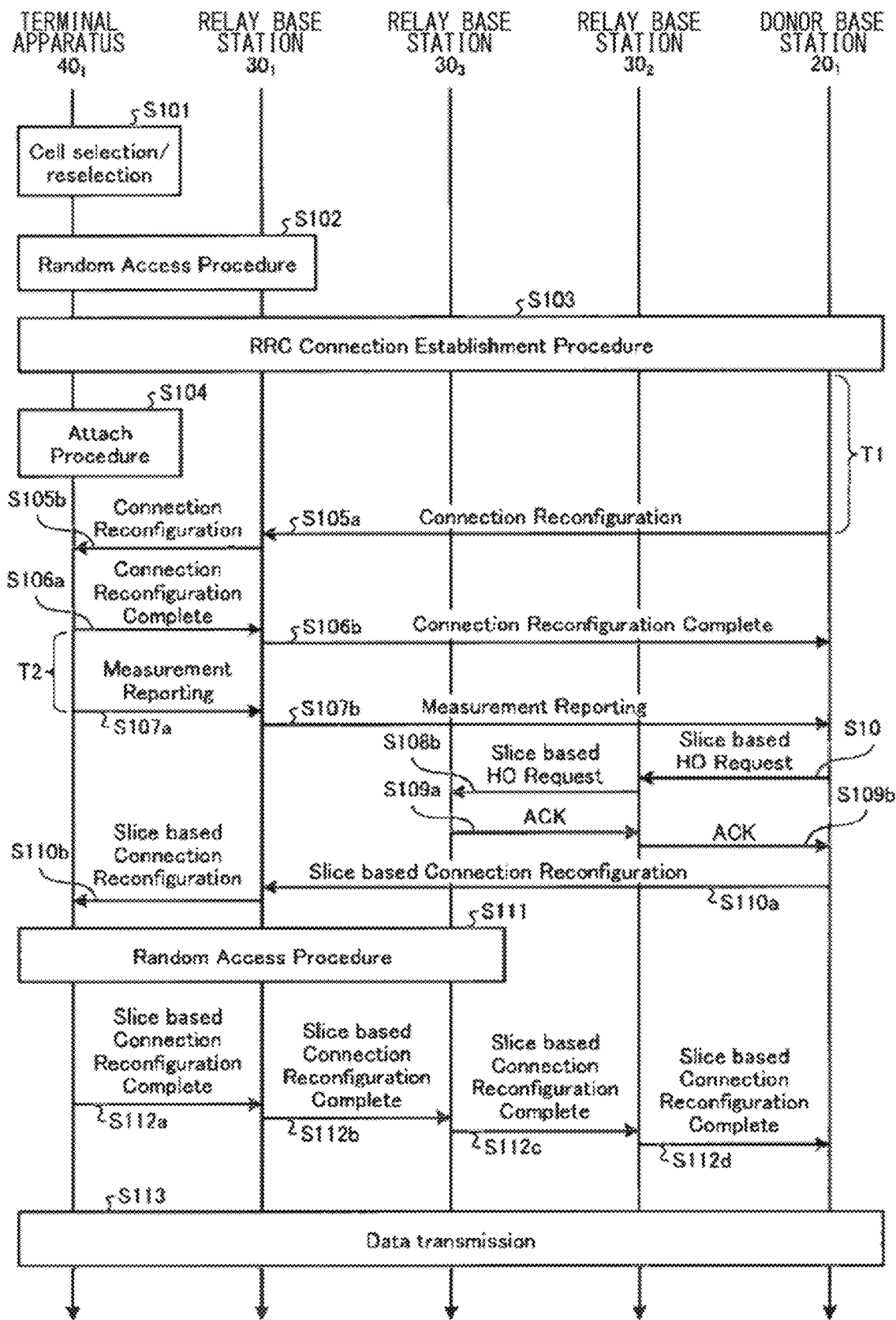
FIG. 11 illustrates an example of connection processing in a case where there is no network slice information from a nearby base station.

FIG. 11 illustrates an example of connection processing in a case where there is no network slice information from a nearby base station. Specifically, FIG. 11 illustrates an example of connection processing in a case where information concerning a network slice is not provided from a base station that is nearby via system information, or where the base station that is nearby does not support a desired network slice. It is to be noted that, in the example of FIG. 11, it is assumed that the terminal apparatus $40_1$ is connected to the donor base station $20_1$ by the path P1 illustrated in FIG. 10, but is not connected to the donor base station $20_1$ by the path P2.

First, the terminal apparatus $40_1$ executes cell selection or cell reselection processing (step S101). Then, on the basis of processing results, the terminal apparatus $40_1$ executes random access processing (Random Access Procedure) on the relay base station $30_1$, which is the highest ranked cell (step S102). Then, the terminal apparatus $40_1$ establishes an RRC connection (Radio Resource Control Connection) with respect to the donor base station $20_1$ via the access line of the relay base station $30_1$ (step S103).

Along with this processing, an SRB (Signaling Radio Bearer) for transmitting and receiving a control signal of a control plane (hereinafter, also referred to as a C-plane) is established. Here, the terminal apparatus $40_1$ is able to use an arbitrary message (e.g., Message 3) of the random access processing or an arbitrary message (e.g., RRC Connection Request, RRC Connection Setup Complete) of RRC connection setting processing (RRC Connection Setup Procedure) to notify information concerning a service to be received by the terminal apparatus $40_1$. For example, the terminal apparatus $40_1$ is able to use an arbitrary message of the RRC connection setting processing to notify the donor base station $20_1$ of a desired slice ID. Here, the slice ID may be, for example, the S-NSSAI, as described above. The acquisition section 231 of the donor base station $20_1$ acquires information concerning the service to be received by the terminal apparatus $40_1$ (e.g., information on the slice ID desired by the terminal apparatus $40_1$). The path P1 set in RRC connection establishment processing (RRC Connection Establishment Procedure) with respect to the donor base station $20_1$ via the access line of the relay base station $30_1$ may be considered as a default path.

Subsequently, the terminal apparatus $40_1$ executes attach processing (Attach Procedure) (step S104). This establishes a DRB (Data Radio Bearer) for transmitting and receiving user plane (hereinafter, also referred to as U-plane) data to and from the donor base station $20_1$. It is to be noted that the CU sets retransmission processing Automatic Repeat reQuest (ARQ) method (e.g., Hop by Hop, or End to End) depending on a slice ID during a process of establishment of a PDU (Protocol Data Unit) session. In a case of a service requiring low delay, e.g., the URLLC, a method is set which controls End to End ARQ processing with less delay, i.e., ARQ processing between a relay base station providing the access line and the donor base station 20. In addition, in a case of the service requiring high throughput, e.g., the eMBB, a method is set which controls Hop by Hop ARQ processing with efficient utilization of a radio resource, i.e., ARQ processing for each backhaul line. Here, Hybrid ARQ processing is set between the relay base station providing the access line and the terminal apparatus 40, in addition to the backhaul line.

On the basis of the information concerning the service to be received by the terminal apparatus $40_1$, the determination section 232 of the donor base station $20_1$ determines a path through which data exchanged between the terminal apparatus $40_1$ and the donor base station $20_1$ passes. For example, the determination section 232 designates the slice ID desired by the terminal apparatus $40_1$, and designates an optimum path providing a network slice corresponding to the designated slice ID (T1 illustrated in FIG. 11). On the basis of the designated path, the instruction section 233 of the donor base station $20_1$ instructs the terminal apparatus $40_1$ of the donor base station 20 or the relay base station 30 to be connected to. For example, the instruction section 233 sets the terminal apparatus $40_1$ to execute measurement reporting processing including, as a measurement target, the relay base station 30 (e.g., relay base station $30_3$) included in the designated path. This indication is set, for example, via a connection reconfiguration message (Connection Reconfiguration message) (steps S105a and S105b).

When completing the setting, the terminal apparatus $40_1$ responds to the donor base station $20_1$ with a connection reconfiguration completion message (Connection Reconfiguration Complete message) via the relay base station $30_1$ (steps S106a and S106b). Meanwhile, in a case where the donor base station $20_1$ is not able to designate an optimum path to provide a network slice corresponding to the desired slice ID, a message rejecting the providing of the desired slice ID is returned.

The terminal apparatus $40_1$ performs measurement including the relay base station $30_3$ as a measurement target on the basis of the set measurement reporting processing (T2 illustrated in FIG. 11). Then, the terminal apparatus $40_1$ reports measurement results to the donor base station $20_1$ via the relay base station $30_1$ (steps S107a and S107b).

Then, in a case where a standard by which the terminal apparatus $40_1$ executes the handover is satisfied, the instruction section 233 of the donor base station $20_1$ instructs the terminal apparatus $40_1$ to perform handover to a base station designated on the basis of the path determined by the determination section 232. For example, a case is assumed where the relay base station 30 providing a network slice corresponding to the desired slice ID is the relay base station $30_3$. At this time, the instruction section 233 determines, for the terminal apparatus $40_1$, handover to the relay base station $30_3$ on the basis of measurement results reported from the terminal apparatus $40_1$. Various known standards may be employed as a determination standard as to whether or not to execute the handover. Then, the instruction section 233 issues a slice-based handover request (Slice based HO Request) to the relay base station $30_3$ (steps S108a and S108b).

When the relay base station $30_3$ responds to the donor base station $20_1$ with an acknowledgment (Slice based HO Request ACK) for the slice-based handover request (steps S109a and S109b), the donor base station $20_1$ transmits, to the relay base station $30_1$, a message (Slice based Connection Reconfiguration message) instructing the terminal apparatus $40_1$ to perform the handover to the relay base station $30_3$ (steps S110a and S110b).

Upon receiving the message, the terminal apparatus $40_1$ executes random access processing on the relay base station $30_3$ (step S111). When the handover to the relay base station $30_3$ is completed, the terminal apparatus $40_1$ transmits a slice-based connection reconfiguration completion message (Slice based Connection Reconfiguration Complete message) to the donor base station $20_1$ (steps S112a, S112b, S112c, and S112d). This allows for setting of the optimum path P2 providing a network slice corresponding to the slice ID. That is, after the terminal apparatus 401 establishes a default path on the basis of the cell selection or cell reselection processing in accordance with an existing mobility managing method, switching to an optimum path is performed prior to transmission and reception of data via the network slice corresponding to the desired slice ID.

Subsequently, the transmission and reception of data via the network slice corresponding to the desired slice ID are started (step S113). The transmission and reception of data are performed by the reception section 234 and the transmission section 235 of the donor base station $20_1$, and the reception section 454 and the transmission section 455 of the terminal apparatus $40_1$.

Here, the terminal apparatus $40_1$ is able to utilize a plurality of network slices simultaneously, and is able to independently execute the processing illustrated in FIG. 11 for each of the network slices. That is, it is possible to simultaneously construct a plurality of radio bearers corresponding to the network slices. When the terminal apparatus $40_1$ has a capability of connection to a plurality of base stations simultaneously, the terminal apparatus $40_1$ is also able to simultaneously construct the radio bearers corresponding to the network slices with respect to the plurality of base stations.

In addition, after completion of the handover to the relay base station $30_3$ providing the network slice corresponding to the desired slice ID, the attach processing (step S104) for establishing a DRB to transmit and receive the U-plane data may be executed on the relay base station $30_3$.

It is to be noted that, as one form of C/U-plane separation, while maintaining a default path via the access line of the relay base station $30_1$ as an SRB for transmitting and receiving a control signal of the C-plane, the terminal apparatus $40_1$ may establish, separately from the SRB, a path including the relay base station $30_3$ for the DRB to transmit and receive the U-plane data of the network slice corresponding to the desired slice ID.

<4-2. Monitoring Processing of Quality of Backhaul Line>

Figure 12:
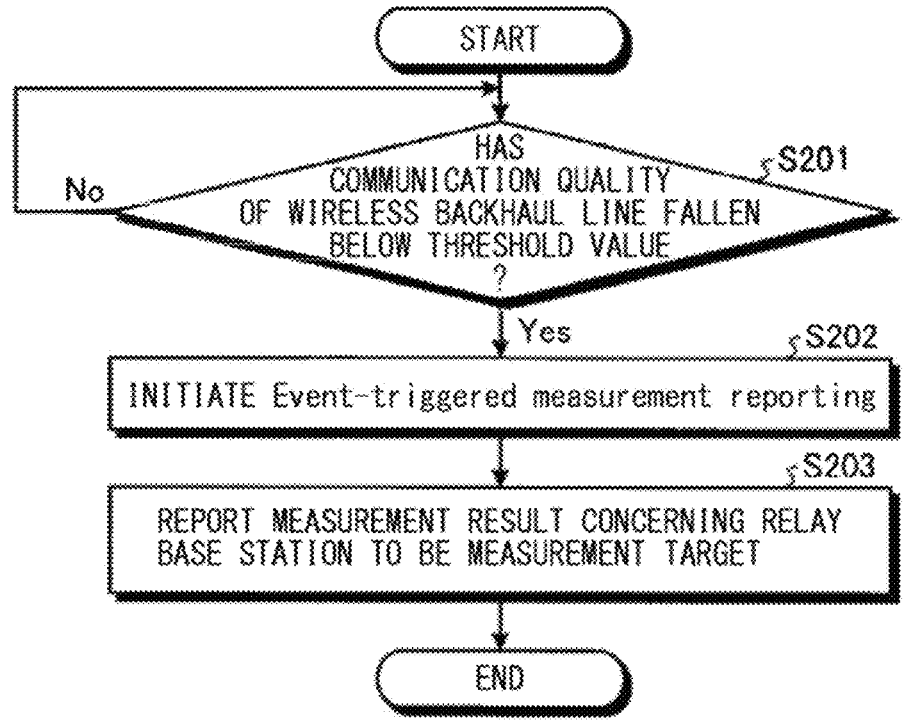
FIG. 12 is a flowchart illustrating an example of monitoring processing of quality of the backhaul line.

Next, description is given of monitoring processing of quality of the backhaul line. FIG. 12 is a flowchart illustrating an example of the monitoring processing of the quality of the backhaul line. The processing illustrated in FIG. 12 is executed by, for example, each of the plurality of relay base stations 30 included in the communication system 1. Hereinafter, description is given of the monitoring processing of quality of the backhaul line with reference to the flowchart of FIG. 12.

First, the relay base station 30 measures the quality of the wireless backhaul line with respect to a parent relay base station 30 (or the donor base station $20_1$) at a fixed or variable cycle to determine whether or not to fall below a threshold value (step S201). Here, the frequency, cycle, and threshold value of the measurement are set by control information (e.g., RRC connection reconfiguration (RRC Connection Reconfiguration), RRC connection release (RRC Connection Release), etc.). In addition, the quality of the backhaul line may be evaluated on the basis of the reception intensity and reception quality of a reference signal or a synchronization signal, i.e., RSRP (Reference Signal Received Power) or RSRQ (Reference Signal Received Quality). It is to be noted that, in the following description, the relay base station 30 serving as a parent of the relay base station 30 executing the monitoring processing may be referred to as a parent relay base station in some instances.

When determination is made in step S201 that the quality of the wireless backhaul line falls below the threshold value, the relay base station 30 initiates event triggered measurement result reporting (Event Triggered measurement reporting) processing (step S202). The relay base station 30 reports, to the donor base station $20_1$, measurement results concerning the quality of each relay base station 30 of a parent candidate to be a measurement target, in addition to the quality of the wireless backhaul line with respect to the parent relay base station (S203). Here, each relay base station 30 of the parent candidate to be the measurement target is set by, for example, the above-described RRC connection reconfiguration or RRC connection release.

It is to be noted that the donor base station $20_1$ may set reporting on a load for each relay base station 30. For example, the donor base station $20_1$ may set to perform reporting in a case where an amount of traffic transmitted and received per unit hour exceeds the threshold value. It is to be noted the amount of the traffic transmitted and received per unit time may be PRB (Physical Resource Block) usage indicating the percentage of PRBs used among the total PRBs per unit frequency and per unit time. Here, the report on the load may be set in a unit of flow or in a unit of bearer. This enables the donor base station $20_1$ to determine switching of backhaul lines for each bearer or for each slice ID. In addition, on the basis of the report on the quality of the backhaul line of each relay base station or on the load of each relay base station, the donor base station $20_1$ may control flow-control, i.e., scheduling of data to be transferred to a child relay base station. The scheduling may be performed for each QoS or for each slice ID. In addition, on the basis of the report on the quality of the backhaul line of each relay base station or on the load of each relay base station, the donor base station 201 may execute Admission Control or Access Control on the child relay base station. Here, the Access Control notifies, for example, Access Control information including Access Class Barring set via the system information.

<4-3. Handover Processing of Backhaul Line>

Figure 13:
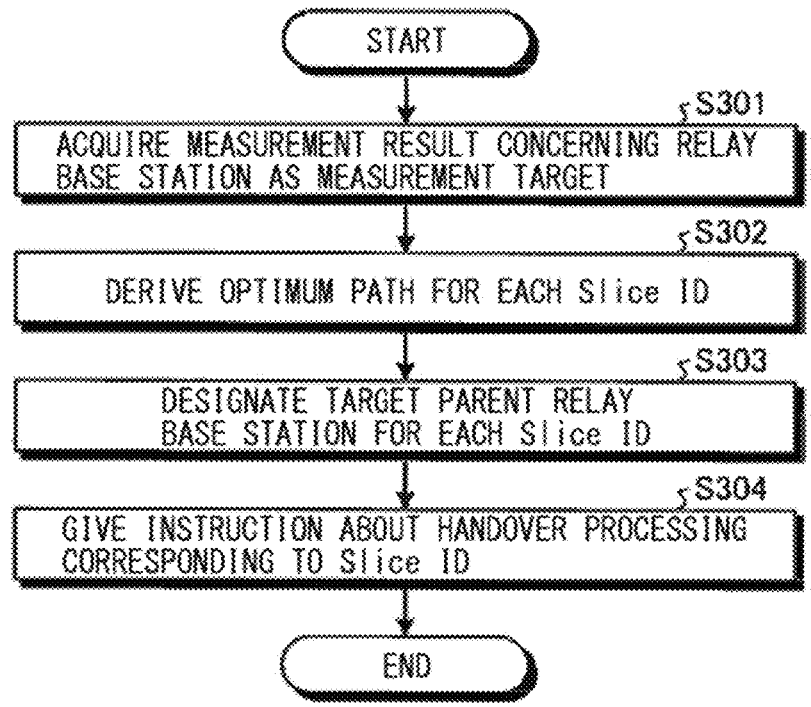
FIG. 13 is a flowchart illustrating an example of handover processing of the backhaul line.

Next, description is given of handover processing of the backhaul line. FIG. 13 is a flowchart illustrating an example of the handover processing of the backhaul line. Processing illustrated in FIG. 13 is executed by the CU (e.g., donor base station 20). In the following description, it is assumed that the donor base station 20$_1$ executes the following handover processing, but the CU executing the following handover processing is not limited to the donor base station 20$_1$. In addition, as described above, the relay base station 30 is one type of the communication apparatus. Hereinafter, description is given of the handover processing of the backhaul line with reference to the flowchart of FIG. 13.

The acquisition section 231 of the donor base station 20$_1$ receives measurement results concerning the quality of each relay base station 30 as a measurement target, from the relay base station 30 having initiated the event triggered measurement result reporting processing (step S301). In the following description, the relay base station 30 having initiated the event triggered measurement result reporting processing is referred to as a relay base station 30 as a handover processing target.

It is to be noted that, in a case where the relay base station 30 as the handover processing target provides the terminal apparatus 40 with an access line, the acquisition section 231 of the donor base station 20$_1$ may acquire, from this relay base station 30, information concerning a service to be received by the terminal apparatus 40 (e.g., slice ID of a slice to be used by the terminal apparatus 40) using the wireless network of the communication system 1. When the terminal apparatus 40 receives a plurality of communication services, the acquisition section 231 may acquire information on the plurality of communication services (e.g., information on a plurality of slice IDs).

Subsequently, on the basis of the information concerning the services, the determination section 232 of the donor base station 20$_1$ determines a path through which data exchanged between the terminal apparatus 40$_1$ and the donor base station 20$_1$ passes. For example, the determination section 232 derives an optimum path for each slice ID (step S302).

Then, on the basis of information on the optimum path, the donor base station 20$_1$ designates a base station to be a handover target of the relay base station 30 as the handover processing target (step S303). Specific description is given by exemplifying FIGS. 9A and 9B. Suppose, for example, that the relay base station 30 as the handover processing target is the relay base station 30$_1$ illustrated in FIG. 9A. If the communication quality of the backhaul line BH1 between the relay base station 30$_1$ and the donor base station 20$_1$ is deteriorated, the donor base station 20$_1$ the donor base station 20$_1$ designates the relay base station 30$_3$ as a base station to be the handover target of the relay base station 30$_1$ as illustrated in 9B. It is to be noted that the base station to be the handover target (hereinafter, referred to as a target base station) is not limited to the relay base station 30, but may be the donor base station 20.

Then, the instruction section 233 of the donor base station 20$_1$ instructs the relay base station 30 as the handover processing target to perform handover processing (step S304). It is to be noted that the instruction section 233 may give an instruction to perform the handover for each slice ID. In this case, there may be a case where the relay base station 30 as the handover processing target is instructed to perform a plurality of handovers in a manner corresponding to the slice ID. In this case, the relay base station 30 establishes a plurality of connections with respect to different target base stations. In addition, the instruction section 233 of the donor base station 20$_1$ reconfigures the ARQ processing (e.g., Hop by Hop, or End to End) corresponding to the slice ID. Here, in a case where the Hop by Hop ARQ processing is reconfigured, a parent relay base station of each backhaul line included in the path may be instructed to reconfigure the ARQ processing, or a parent relay base station of a backhaul line on which the handover has been executed may be instructed to reconfigure the ARQ processing. It is to be noted that, even in a case where the parent relay base station of the backhaul line on which the handover has been executed is instructed to reconfigure the ARQ processing, a parent relay base station of another backhaul line may be instructed to reset transfer processing or the ARQ processing. Meanwhile, in a case of reconfiguring the End-to-End ARQ processing, the parent relay base station of each backhaul line may be instructed to reset the transfer processing. Further, a relay base station providing an access line may be instructed to reset the transfer processing or the Hybrid ARQ processing.

<4-4. Handover Processing of Access Line>

Figure 14:
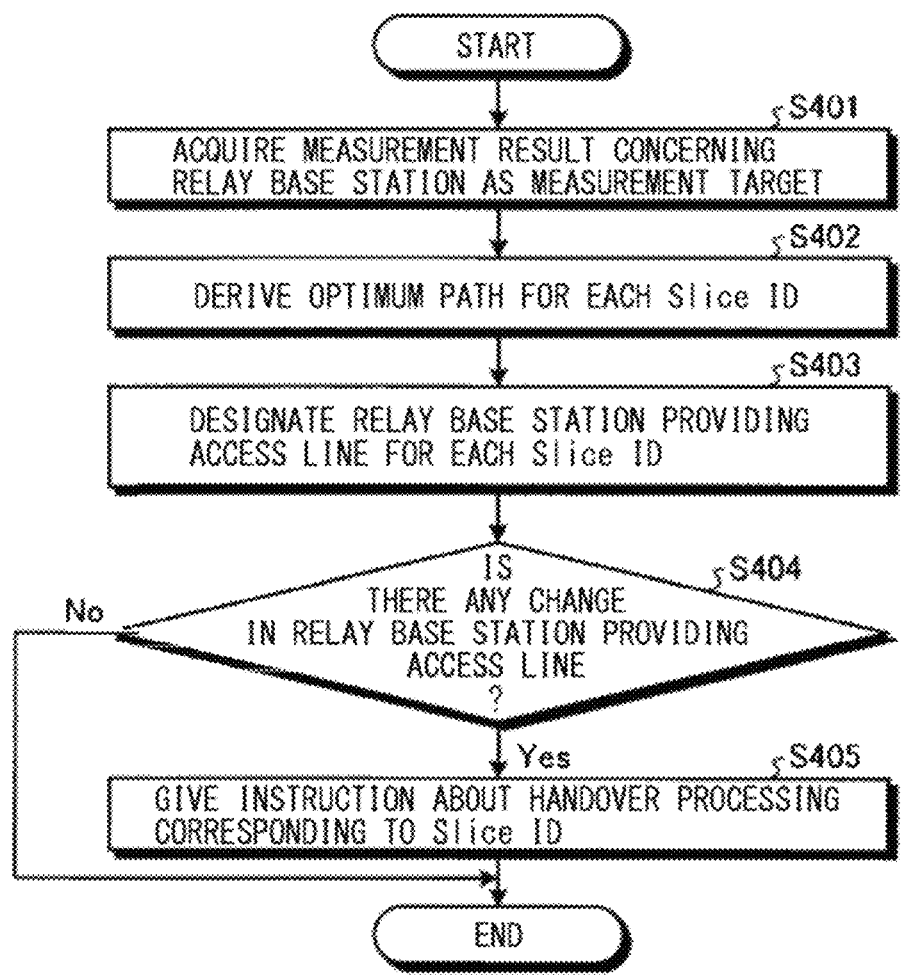
FIG. 14 is a flowchart illustrating an example of handover processing of an access line.

Next, description is given of handover processing of an access line. FIG. 14 is a flowchart illustrating an example of the handover processing of the access line. It is to be noted that the processing illustrated in FIG. 14 is executed by the CU (e.g., donor base station 20). In the following description, it is assumed that the donor base station 20$_1$ executes the following handover processing, but the CU executing the following handover processing is not limited to the donor base station 20$_1$. In addition, as described above, the terminal apparatus 40 is one type of the communication apparatus. Hereinafter, description is given of the handover processing of the access line with reference to the flowchart of FIG. 14.

The acquisition section 231 of the donor base station 20$_1$ acquires measurement results concerning the quality of each relay base station 30 as a measurement target from the relay base station 30 having initiated the event triggered measurement result reporting processing (step S401). Subsequently, the determination section 232 of the donor base station 20$_1$ derives an optimum path for each slice ID (step S402). Then, on the basis of information on the optimum path, the determination section 232 designates the relay base station 30 that provides the access line to the terminal apparatus 40 for each slice ID (step S403).

Then, the instruction section 233 of the donor base station 20$_1$ determines whether or not there is any change in the relay base station 30 providing the access line to the terminal apparatus 40 for each slice ID (step S404). For the slice ID in which a change occurs, the instruction section 233 instructs the terminal apparatus 40$_1$ that utilizes a service corresponding to such a slice ID to perform handover processing (step S405). In addition, the instruction section 233 of the donor base station 201 reconfigures the ARQ processing corresponding to the slice ID. Here, in a case of the reconfiguration of the Hop by Hop ARQ processing, a parent relay base station of each backhaul line included in the path may be instructed to reconfigure the ARQ processing, or only a parent relay base station of a backhaul line influenced by path switching may be instructed to reconfigure the ARQ processing. It is to be noted that, even in a case where only the parent relay base station of the backhaul line influenced by the path switching is instructed to reconfigure the ARQ processing, a parent relay base station of another backhaul line may be instructed to reset transfer processing or the ARQ processing. Meanwhile, in a case of reconfiguring the End-to-End ARQ processing, the parent relay base station of each backhaul line may be instructed to reset the transfer processing. Further, the Hybrid ARQ processing is set between the relay base station providing the access line and the terminal apparatus 40, in addition to the backhaul.

<4-5. Signaling Flow According to Optimum Path Selection Corresponding to Slice ID>

Figure 15A:
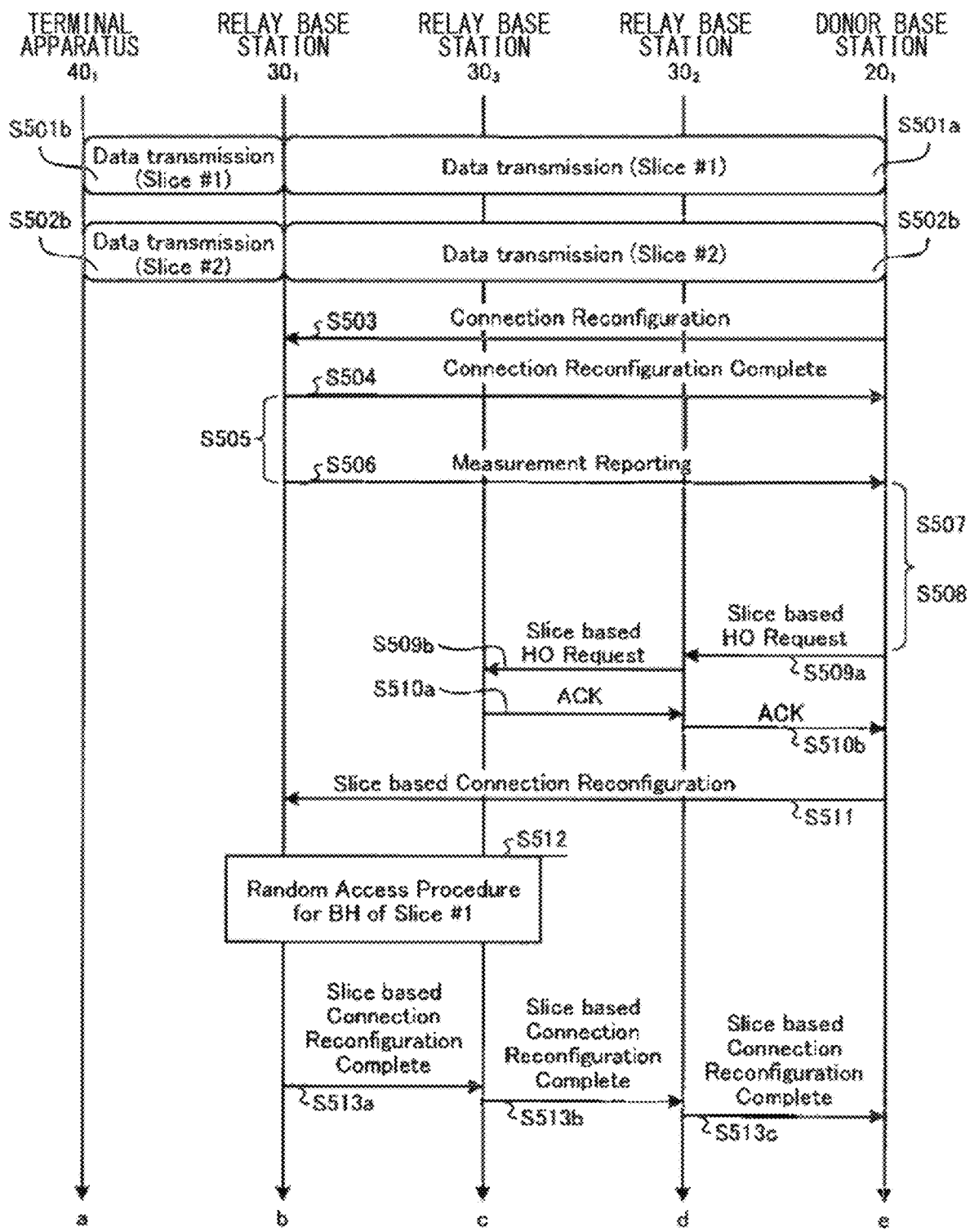
FIG. 15A illustrates an example of a signaling flow according to optimum path selection corresponding to a slice ID.

Next, description is given of a signaling flow according to the optimum path selection corresponding to the slice ID. FIGS. 15A and 15B each illustrate an example of the signaling flow according to the optimum path selection corresponding to the slice ID. The following description is given assuming that that the terminal apparatus $40_1$ and the donor base station $20_1$ are in the connected state illustrated in FIG. 9A.

First, as illustrated in the example of FIG. 9A, as for both of the first service (slice ID #1) and the second service (slice ID #2), data is transmitted and received between the terminal apparatus $40_1$ and the donor base station $20_1$ via the access line AL1 and the backhaul line BH1 (steps S501a, S501b, S502a, and S502b in FIG. 15A). The access line AL1 is a line between the terminal apparatus $40_1$ and the relay base station $30_1$. The backhaul line BH1 is a line between the relay base station $30_1$ and the donor base station $20_1$.

Next, in order to monitor the quality of the backhaul line BH1 between the relay base station $30_1$ and the donor base station $20_1$, the donor base station $20_1$ sets measurement and a reporting method thereof in the relay base station $30_1$ via control information (e.g., a connection reconfiguration message (Connection Reconfiguration message)) (step S503). Upon completion of the setting, the relay base station $30_1$ transmits control information (e.g., a connection reconfiguration completion message (Connection Reconfiguration Complete message)) to the donor base station $20_1$ (step S504).

The relay base station $30_1$ starts monitoring the quality of the backhaul line with respect to the donor base station $20_1$ on the basis of the setting, and, when the quality falls to or below a threshold value, starts measuring the relay base station 30 as a measurement target (step S505). Here, the relay base station 30 as the measurement target indicates the relay base station 30 and the donor base station $20_1$ which are to be a target base station of the handover. Further, on the basis of a set condition, the relay base station $30_1$ initiates the event triggered measurement result reporting (Event Triggered measurement reporting) processing, and reports, to the donor base station $20_1$, measurement results including qualities of a current parent relay base station (or donor base station $20_1$) and the relay base station 30 as the measurement target (step S506).

On the basis of information concerning a service to be received by the terminal apparatus $40_1$ using the communication system 1, the determination section 232 of the donor base station $20_1$ determines a path through which data exchanged between the terminal apparatus $40_1$ and the donor base station $20_1$ passes. For example, the determination section 232 derives an optimum path on the basis of the received measurement results and the slice ID according to the service utilized by the terminal apparatus $40_1$ (step S507). Here, the service utilized by the terminal apparatus $40_1$ may be a plurality of services as illustrated in the example of FIG. 9A. Further, the donor base station $20_1$ designates a slice ID necessary for establishment of a new backhaul line (step S508).

The instruction section 233 of the donor base station $20_1$ transmits a handover request, e.g., a slice-based handover request (Slice based HO Request) to the relay base station $30_3$ to be the target base station of the handover for the designated slice ID (steps S509a and S509b). The relay base station $30_3$ having finished a necessary preparation returns, to the donor base station $20_1$, a response to the handover request, e.g., a slice-based handover request acknowledgment (Slice based HO Request ACK) (steps S510a and S510b).

Next, the instruction section 233 of the donor base station $20_1$ transmits, to the relay base station $30_1$, a handover instruction including information concerning the slice ID that requires handover of the backhaul line, e.g., slice-based connection reconfiguration (Slice based Connection Reconfiguration) (step S511).

The relay base station $30_1$ having received the handover instruction executes random access processing (Random Access Procedure) in order to switch the connection of the backhaul line for the first service (slice ID #1) from the donor base station $20_1$ to the relay base station $30_3$ (step S512).

Upon completion of the switching of the connection of the backhaul line for the designated slice ID, the relay base station $30_1$ returns, to the donor base station $20_1$, a response to the handover instruction (e.g., slice-based connection reconfiguration completion (Slice based Connection Reconfiguration Complete)) (steps S513a, S513b, and S513c), and the necessary handover of the backhaul line is completed.

Subsequently, the donor base station $20_1$ notifies updating of information to control routing in each relay base station 30 or the donor base station $20_1$ (steps S514a, S514b, and S514c of FIG. 15B). The information to control the routing is, for example, information concerning a change in a routing table according to a slice ID, bearer mapping according to the slice ID, or control of QoS flow mapping. Here, the bearer mapping according to the slice ID may be information for identification of a path determined in accordance with the slice ID, e.g., bearer mapping according to a path ID. The QoS flow mapping according to the slice ID may be information for identification of the path determined in accordance with the slice ID, e.g., QoS flow mapping according to the path ID.

Next, on the basis of the slice-based connection reconfiguration received from the donor base station $20_1$ (step S511), the relay base station $30_1$ providing the terminal apparatus $40_1$ with the access line sets, in the terminal apparatus $40_1$, a measurement method and a reporting method necessary for the terminal apparatus $40_1$ to switch access lines in accordance with the slice ID (step S515). At this time, the relay base station $30_1$ may set, in the terminal apparatus $40_1$, the measurement method and the reporting method via the control information (e.g., slice-based connection reconfiguration).

On the basis of the setting, the terminal apparatus $40_1$ measures the relay base station $30_1$ to be a measurement target or the donor base station $20_1$ in accordance with the slice ID (T3 in FIG. 15B). Then, the terminal apparatus $40_1$ reports measurement results to the donor base station $20_1$ (steps S516a, S516b, S516c, and S516d).

The instruction section 233 of the donor base station $20_1$ designates a slice ID that requires handover of an access line on the basis of the received measurement results (T4 in FIG. 15B). Then, the instruction section 233 instructs the terminal apparatus $40_1$ to perform the handover according to the slice ID via the control information (e.g., slice-based connection reconfiguration) (steps S517a, S517b, S517c, and S517d).

The terminal apparatus $40_1$ having received the handover instruction executes random access processing in order to switch connection of an access line for the second service (slice ID #2) from the relay base station $30_1$ to the donor base station $20_1$ (step S518). Upon completion of the switching of the connection of the access line for the designated slice ID, the terminal apparatus $40_1$ returns, to the donor base station $20_1$, a response to the handover instruction, e.g., the slice-based connection reconfiguration completion (Slice based Connection Reconfiguration Complete) (step S519), and the necessary handover of the access line is completed.

Thereafter, data according to the first service (slice ID #1) is transmitted and received via the access line AL1, and the backhaul lines BH2, BH3, and BH4 (steps S520a, S520b, S520c, and S520d). The access line AL1 is a line between the terminal apparatus $40_1$ and the relay base station $30_1$. The backhaul line BH2 is a line between the relay base station $30_2$ and the donor base station $20_1$. The backhaul line BH3 is a line between the relay base station $30_3$ and the relay base station $30_2$. The backhaul line BH4 is a line between the relay base station $30_1$ and the relay base station $30_3$. Meanwhile, data according to the second service (slice ID #2) is transmitted and received via the access line AL2 between the terminal apparatus $40_1$ and the donor base station $20_1$ (step S521).

In addition, as described above, the relay base station 30 is not only a node that establishes a backhaul line with another relay base station 30 to transfers data, but also a node that provides, by itself, the terminal apparatus 40 with an access line. Therefore, the relay base station 30 providing the terminal apparatus 40 with an access line provides the terminal apparatus 40 with information that assists in utilizing network slicing. For example, the relay base station 30 provides the terminal apparatus 40 with the type of a service that is providable as the access line. For example, the relay base station 30 notifies of a list of available slice IDs as one of the system information. Here, the slice ID may be, for example, the S-NSSAI, as described above. Before transmitting a connection establishment request including a desired slice ID, the terminal apparatus 40 in an Idle mode acquires the list of the available slice IDs notified as the system information to thereby be able to know whether or not the relay base station 30 to be a connection target is available for a desired service.

In addition, in a case where there is a change in the list of the available slice IDs due to the change in the path of the backhaul line, the list of the slice IDs included in the notified system information is changed. The donor base station 20 may notify the terminal apparatus 40 in a Connected mode of a change in the list of the slice IDs via the control information, e.g., RRC signaling. Further, in a case where it is not possible to provide a service corresponding to the slice ID currently utilized by the terminal apparatus 40 in the Connected mode due to the change in the path of the backhaul line, the donor base station 20 may initiate handover processing to a target base station (e.g., donor base station $20_1$ in FIG. 8B) that is able to provide such a service. Specifically, the donor base station 20 may transmit control information concerning a connection setting change including information on a target base station, e.g., an RRC connection reconfiguration message (RRC Connection Reconfiguration message) to the terminal apparatus 40. The description of the donor base station 20 is replaceable with the CU.

According to the above-described processing, the donor base station 20 having determined an optimum path depending on the service (e.g., for each slice ID) allows for less frequent path switching based on such a reason that the service is unavailable due to insufficient communication speed of the terminal apparatus 40. As a result, the donor base station 20 is able to reduce signaling, thus making it possible to achieve stable communication.

<4-6. Connection Processing of Terminal Apparatus Based on Slice ID>

Next, description is given of connection processing of the terminal apparatus 40. In the above examples, the terminal apparatus 40 is connected to a base station on the basis of the judgment of the donor base station 20, but may be connected to the base station on the basis of its own judgment.

Figure 16:
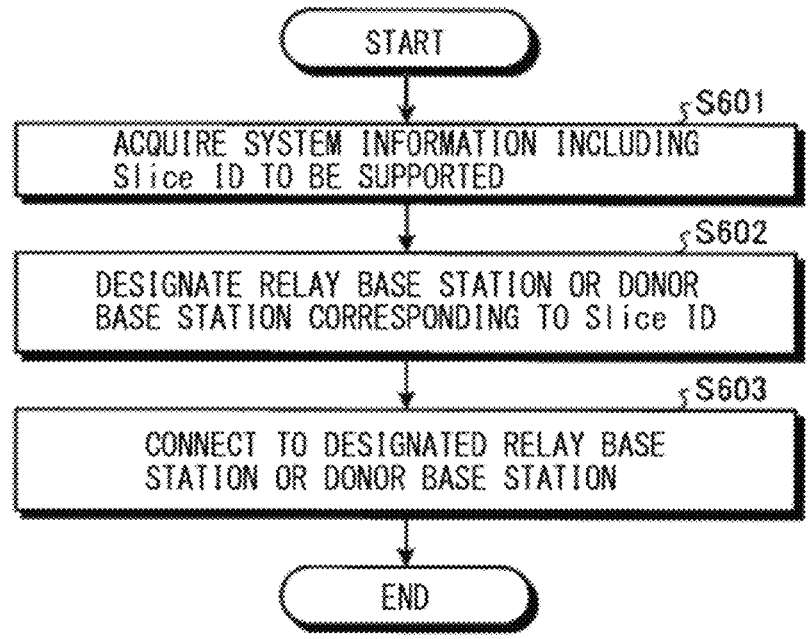
FIG. 16 is a flowchart illustrating an example of connection processing of a terminal apparatus based on a slice ID.

FIG. 16 is a flowchart illustrating an example of connection processing of the terminal apparatus 40 on the basis of a slice ID. It is to be noted that, in the following description, the connection processing illustrated in FIG. 16 is assumed to be executed by the terminal apparatus 40, but the apparatus executing the connection processing may be a communication apparatus other than the terminal apparatus 40. Hereinafter, description is given of the connection processing of the terminal apparatus 40 based on the slice ID, with reference to the flowchart of FIG. 16.

First, the acquisition section 451 of the terminal apparatus 40 in the Idle mode acquires information concerning communication of a base station that is nearby. For example, via system information notified from the base station that is nearby (hereinafter, referred to as a nearby base station), the acquisition section 451 acquires information on a network slice supported by the nearby base station (step S601). At this time, the nearby base station may be the relay base station 30, or may be a donor base station. In addition, there may be a plurality of nearby base stations. In this case, the acquisition section 451 acquires information concerning each communication of the plurality of nearby base stations.

It is to be noted that the information concerning the network slice may be information on a slice ID of the network slice supported by the nearby base station. In addition, the slice ID may be, for example, the S-NSSAI, as described above. For example, the information concerning the network slice may be a list of identification information to distinguish between a plurality of network slices.

Subsequently, when the information acquired in step S601 includes identification information corresponding to a desired network slice, the designation section 452 of the terminal apparatus 40 designates the above-described nearby base station as a base station supporting the desired network slice (step S602). When there is a plurality of nearby base stations, the designation section 452 designates a base station supporting the desired network slice from among the plurality of nearby base stations.

Then, the terminal apparatus 40 executes initial access on the nearby base station designated in step S602 for connection (step S603).

According to the above-described processing, the terminal apparatus 40 designates the base station supporting the desired network slice on its own judgment for connection, thus making it possible to reduce signaling of the CU (e.g., donor base station 20). As a result, the communication becomes stable.

<4-7. Handover Processing of Terminal Apparatus Based on Slice ID>

Next, description is given of handover processing of the terminal apparatus 40. In the above examples, the terminal apparatus 40 executes the handover on the basis of the judgment of the donor base station 20, but may execute handover on the basis of its own judgment.

Figure 17:
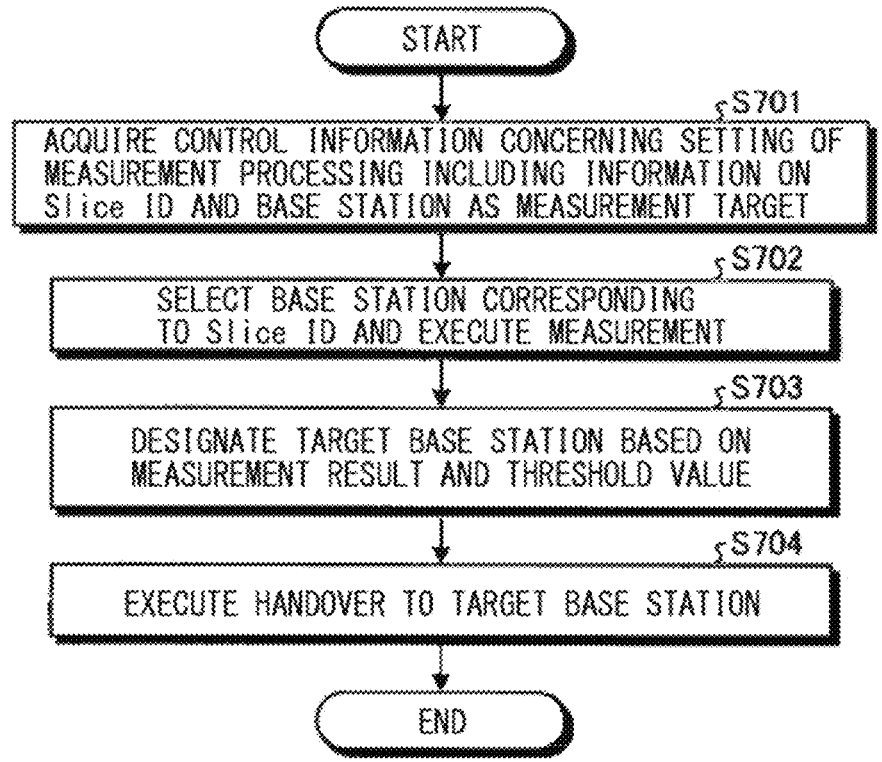
FIG. 17 is a flowchart illustrating an example of handover processing of a terminal apparatus based on a slice ID.

FIG. 17 is a flowchart illustrating an example of the handover processing of the terminal apparatus 40 on the basis of the slice ID. It is to be noted that, in the following description, the handover processing illustrated in FIG. 17 is assumed to be executed by the terminal apparatus 40, but the apparatus executing the handover processing may be a communication apparatus other than the terminal apparatus 40. Hereinafter, description is given of the handover processing of the terminal apparatus 40 based on the slice ID, with reference to the flowchart of FIG. 17.

First, the acquisition section 451 of the terminal apparatus 40 in the Connected mode acquires control information concerning setting of measurement processing via a connected base station (step S701). At this time, the acquired control information includes information on base stations to be measurement candidates. The switch section 453 of the terminal apparatus 40 makes a setting concerning the measurement processing on the basis of the control information. In the following description, the setting concerning the measurement processing is referred to as a measurement processing setting.

Subsequently, the designation section 452 of the terminal apparatus 40 selects a base station that supports a desired slice ID from among the base stations to be the measurement candidates. Then, the switch section 453 of the terminal apparatus 40 executes measurement of measurement items on the basis of the measurement processing setting (step S702). The base station to be the measurement candidate may be the relay base station 30, or may be the donor base station 20.

It is to be noted that the measurement item based on the measurement processing setting is, for example, RSRP (Reference Signal Received Power), an RSRQ (Reference Signal Received Quality), an SINR (Signal to Interference and Noise Ratio), an RSSI (Received Signal Strength Indicator), or the like.

Next, the designation section 452 of the terminal apparatus 40 designates a target base station to be a handover destination on the basis of measurement results and threshold values included in the measurement processing setting (S703). For example, in a case where a measured value of a currently connected base station (e.g., a value of RSRP, RSRQ, SINR or RSSI) falls below a first threshold value and where a measured value of one base station of the plurality of measurement candidates exceeds a second threshold value, determination is made that a switching standard of the base station is satisfied, and the base station exceeding the second threshold value is designated as the target base station. It is to be noted that the switching standard to be a standard for executing the handover is not limited to this example, and various known standards are employable.

Then, when the switching standard of the base station is satisfied, the switch section 453 of the terminal apparatus 40 executes the handover to the target base station (step S704). It is to be noted that the threshold value included in the setting of the measurement processing is a threshold value in measurement results for initiating the handover, and a different value may be set depending on the slice ID.

According to the above-described processing, the terminal apparatus 40 designates, on its own judgment, a base station supporting a desired network slice, and executes the handover, thus making it possible to reduce signaling of the CU (e.g., donor base station 20). As a result, the communication of the communication system 1 becomes stable.

5. MODIFICATION EXAMPLES

The foregoing embodiments are merely exemplary, and various modifications and applications are possible.

For example, in the foregoing embodiment, the donor base station 20 determines a path of data exchanged between the terminal apparatus 40 and the donor base station 20 on the basis of information concerning a service to be received by the terminal apparatus 40 using the communication system 1. At this time, the information concerning the service is not limited to the slice ID, and may be, for example, information for designating which of a plurality of communication services other than the slice ID. At this time, the plurality of communication services may include at least two communication services selected from the mMTC, the eMBB, and the URLLC.

In the foregoing embodiment, the donor base station 20 determines a path through which data passes on the basis of the slice ID. At this time, the donor base station 20 may determine the relay base station 30 through which the data passes on the basis of information on communication delay to be allowed by a network slice indicated by the slice ID. For example, the donor base station 20 determines the number of hops of the path in accordance with the communication delay to be allowed by the network slice. Then, the donor base station 20 designates a path of equal to or less than the determined number of hops.

In the foregoing embodiment, on the basis of information on network slices supported by a plurality of base stations, the terminal apparatus 40 designates a base station to be connected to from among the plurality of base stations. However, the terminal apparatus 40 may designate the base station to be connected to from among the plurality of base stations on the basis of information concerning communication services supported by the plurality of base stations. At this time, the information concerning the communication services may be information indicating which of the plurality of communication services having different communication modes. At this time, the plurality of communication services may include at least two communication services selected from the mMTC, the eMBB, and the URLLC.

In addition, the terminal apparatus 40 in the Idle mode may execute cell selection or cell reselection, and may execute initial access processing on the highest ranked cell (hereinafter, referred to as a first relay base station 30) as a result of the cell reselection. Then, after constructing radio bearers with respect to the first relay base station 30, in a case where the first relay base station 30 does not support a desired network slice, the terminal apparatus 40 may set a relay base station 30 supporting the desired network slice, as the relay base station 30 as the handover processing target (hereinafter, referred to as a second relay base station 30). On the basis of measurement results including the second relay base station as a measurement target, the terminal apparatus 40 may execute the handover using the above second relay base station as a target base station.

A control device that controls the management apparatus 10, the donor base station 20, the relay base station 30, or the terminal apparatus 40 of the present embodiment may be achieved by a dedicated computer system or a general-purpose computer system.

For example, a communication program for executing the above-described operations (e.g., connection processing or handover processing, etc.) is stored in a computer-readable recording medium such as an optical disk, a semiconductor memory, a magnetic tape and a flexible disk, and is distributed. Then, for example, the program is installed in a computer, and the above-described processing is executed, to thereby configure the control device. At this time, the control device may be a device (e.g., a personal computer) outside the management apparatus 10, the donor base station 20, the relay base station 30, or the terminal apparatus 40. In addition, the control device may be a device (e.g., the control unit 13, the control unit 23, the control unit 34, or the control unit 45) inside the management apparatus 10, the donor base station 20, the relay base station 30, or the terminal apparatus 40.

In addition, the above communication program may be stored in a disk device included in a server apparatus on a network such as the Internet to enable, for example, downloading to a computer. In addition, the above-described functions may be achieved by cooperation between an OS (Operating System) and application software. In this case, a portion other than the OS may be stored in a medium for distribution, or a portion other than the OS may be stored in a server apparatus to enable, for example, downloading to a computer.

In addition, every or some processing described in the foregoing embodiments as being performed automatically may be performed manually, or every or some processing described as being performed manually may be performed automatically in a known method. Aside from those described above, the information including processing procedures, specific names, and various types of data and parameters illustrated herein and drawings may be arbitrarily changed unless otherwise specified. For example, the various types of information illustrated in the drawings are not limited to the illustrated information.

In addition, the illustrated respective components of the apparatuses are functional and conceptual, and do not necessarily need to be physically configured as illustrated. That is, the specific form of discreteness and integration of the apparatuses is not limited to those illustrated, and all or a portion thereof may be functionally or physically configured discretely and integrally in an arbitrary unit, depending on various loads, statuses of use, etc.

Further, the above-described embodiments may be appropriately combined in a region with no contradiction in a processing content. In addition, the order of the steps illustrated in the flowcharts and sequence diagrams of the foregoing embodiments described above may be changed appropriately.

6. CLOSING

As described above, according to an embodiment of the present disclosure, the communication control apparatus (CU in donor base station 20, etc.) determines a path through which data exchanged between the terminal apparatus 40 and the donor base station 20 passes, on the basis of information concerning a service (e.g., information concerning slice ID and communication mode) to be received by the terminal apparatus 40 connected to a wireless network of the communication system 1 using the wireless network. The communication control apparatus determines an optimum path depending on the service (e.g., for each slice ID), and thus there is less frequent path switching based on such a reason that the service is unavailable. As a result, there is less signaling of the communication control apparatus, thus achieving stable communication.

Employing wireless backhaul for handling a large amount of data enables elimination of a trouble of installing a fixed optical cable. In a case where a millimeter wave is utilized for a backhaul line, the communication quality may easily become unstable due to external circumstances. Also in this case, the communication control apparatus is able to quickly and flexibly construct a path suitable for each of communication services having different communication modes, thus making it possible to reduce instability of the communication quality.

Further, in a case where the information concerning the slice ID is employed as the information concerning the service, the communication control apparatus is able to achieve data transmission using paths suitable for respective services having different characteristics on the basis of the concept of the network slicing. For example, the communication control apparatus is able to provide the terminal apparatus 40 with an appropriate path for each slice.

In addition, on the basis of information concerning communication of each of a plurality of base stations (e.g., donor base station 20 and relay base station 30), the terminal apparatus 40 designates a base station to be connected to from among the plurality of base stations. For example, the terminal apparatus 40 designates information on the network slice supported by each of the plurality of base stations. The terminal apparatus 40 designates, by itself, a base station to be a connection destination, and thus making it possible to reduce signaling of the communication control apparatus. As a result, it is possible for the terminal apparatus 40 to stabilize the communication of the communication system 1.

The description has been given above of the respective embodiments of the present disclosure; however, the technical scope of the present disclosure is not limited to the foregoing respective embodiments as they are, and various alterations may be made without departing from the gist of the present disclosure. In addition, components throughout different embodiments and modification examples may be combined appropriately.

In addition, the effects in the respective embodiments described herein are merely illustrative and non-limiting, and may have other effects.

It is to be noted that the present technology may also have the following configurations.

(1)

A communication control apparatus including:
an acquisition section that acquires information concerning a service to be received, using a communication system, by a communication apparatus connected to the communication system that includes a relay base station to which the communication apparatus is connectable and a donor base station which provides the relay base station with a wireless backhaul line; and
a determination section that determines a path through which data exchanged between the communication apparatus and the donor base station passes on a basis of the information concerning the service.

(2)

The communication control apparatus according to (1), in which
the acquisition section acquires information for designating which of a plurality of communication services having different communication modes the service to be received by the communication apparatus is, and
the determination section determines the path through which the data passes on a basis of the information for designating which of the plurality of communication services.

(3)

The communication control apparatus according to (2), in which the plurality of communication services includes at least two communication services selected from massive Machine Type Communication, enhanced Mobile BroadBand, and Ultra-Reliable and Low Latency Communication.

(4)

The communication control apparatus according to (2) or (3), in which
   the communication apparatus is configured to receive at least the two communication services simultaneously, and
   the determination section determines the path through which the data passes for each of the communication services.

(5)

The communication control apparatus according to any one of (1) to (4), in which
   the communication system supports a plurality of network slices,
   the acquisition section acquires, as the information concerning the service, identification information on a network slice corresponding to the service, and
   the determination section determines the path through which the data passes on a basis of the identification information on the network slice.

(6)

The communication control apparatus according to (5), in which the determination section determines the relay base station through which the data passes on a basis of information on communication delay to be allowed by the network slice indicated by the identification information.

(7)

The communication control apparatus according to (5), in which
   the communication apparatus is configured to use at least two network slices simultaneously, and
   the determination section determines the path through which the data passes for each of the network slices.

(8)

The communication control apparatus according to according to any one of (1) to (7), including an instruction section that instructs the communication apparatus of the donor base station or the relay base station to be connected to on a basis of the path determined by the determination section.

(9)

The communication control apparatus according to (8), in which, in a case where a standard by which the communication apparatus executes handover is satisfied, the instruction section instructs the communication apparatus to perform the handover to a base station designated on the basis of the path determined by the determination section.

(10)

A communication apparatus including:
   an acquisition section that acquires information concerning communication of each of a plurality of base stations included in a communication system that includes, as a base station, at least a relay base station and a donor base station providing the relay base station with a wireless backhaul line; and
   a designation section that designates a base station to be connected to from among the plurality of base stations on a basis of the information concerning the communication of each of the plurality of base stations.

(11)

The communication apparatus according to (10), in which
   the acquisition section acquires, as the information concerning the communication of each of the plurality of base stations, information concerning a communication service supported by each of the plurality of base stations, and
   the designation section designates a base station to be connected to from among the plurality of base stations on a basis of the information concerning the communication service supported by each of the plurality of base stations.

(12)

The communication apparatus according to (11), in which
   the information concerning the communication service includes information indicating which of a plurality of the communication services having different communication modes the communication service supported by the base station is, and
   the plurality of the communication services includes at least two communication services selected from massive Machine Type Communication, enhanced Mobile BroadBand, and Ultra-Reliable and Low Latency Communication.

(13)

The communication apparatus according to according to any one of (10) to (12), in which
   the acquisition section acquires, as the information concerning the communication of each of the plurality of base stations, information on a network slice supported by each of the plurality of base stations, and
   the designation section designates a base station to be connected to from among the plurality of base stations on a basis of the information on the network slice supported by each of the plurality of base stations.

(14)

The communication apparatus according to according to any one of (10) to (13) including a switch section that executes handover, in which
   the acquisition section acquires information on a switching standard serving as a standard by which the handover is executed, and
   the switch section determines whether or not the switching standard is satisfied, and, in a case where the switching standard is satisfied, executes the handover using the base station designated by the designation section, as a base station to be switched.

(15)

A communication control method including:
   acquiring information concerning a service to be received, using a communication system, by a communication apparatus connected to the communication system that includes a relay base station to which the communication apparatus is connectable and a donor base station which provides the relay base station with a wireless backhaul line; and
   determining a path through which data exchanged between the communication apparatus and the donor base station passes on a basis of the information concerning the service.

(16)

A communication method executed by a communication apparatus, the method including:
   acquiring information concerning communication of each of a plurality of base stations included in a communication system that includes, as a base station, at least a relay base station and a donor base station providing the relay base station with a wireless backhaul line; and
   designating a base station to be connected to by the communication apparatus from among the plurality of base stations on a basis of the information concerning the communication of each of the plurality of base stations.

(17)

A communication control program that causes a computer to function as:
    an acquisition section that acquires information concerning a service to be received, using a communication system, by a communication apparatus connected to the communication system that includes a relay base station to which the communication apparatus is connectable and a donor base station which provides the relay base station with a wireless backhaul line; and
    a determination section that determines a path through which data exchanged between the communication apparatus and the donor base station passes on a basis of the information concerning the service.

(18)

A communication program that causes a computer included in a communication apparatus to function as:
    an acquisition section that acquires information concerning communication of each of a plurality of base stations included in a communication system that includes, as a base station, at least a relay base station and a donor base station providing the relay base station with a wireless backhaul line; and
    a designation section that designates a base station to be connected by the communication apparatus from among the plurality of base stations on a basis of the information concerning the communication of each of the plurality of base stations.

(19)

A communication system including, at least:
    a relay base station to which a communication apparatus is connectable; and
    a donor base station which provides the relay base station with a wireless backhaul line,
    at least one apparatus included in the communication system including
        an acquisition section that acquires information concerning a service to be received by the communication apparatus using the communication system, and
        a determination section that determines a path through which data exchanged between the communication apparatus and the donor base station passes on a basis of the information concerning the service.

(20)

A communication system including:
    a relay base station, and a donor base station providing the relay base station with a wireless backhaul line, as a base station; and
    a communication apparatus connectable to at least one of a plurality of the base stations,
    the communication apparatus including
        an acquisition section that acquires information concerning communication of each of the plurality of the base stations included in the communication system, and
        a designation section that designates a base station to be connected to from among the plurality of the base stations on a basis of the information concerning the communication of each of the plurality of the base stations.

REFERENCE NUMERALS LIST 1 communication system
10 management apparatus
20 donor base station
30 relay base station
40 terminal apparatus
11 communication unit
12, 22, 32, 42 storage unit
13, 23, 34, 45 control unit
21, 31, 41 wireless communication unit
33, 43 network communication unit
44 input/output unit
211, 311, 411 reception processor
211a, 411a wireless reception section
211b, 411b multiple separation section
211c, 411c demodulation section
211d, 411d decoding section
212, 312, 412 transmission processor
212a, 412a encoding section
212b, 412b modulation section
212c, 412c multiplex section
212d, 412d wireless transmission section
213, 313, 413 antenna
231, 451 acquisition section
232 determination section
233 instruction section
234, 454 reception section
235, 455 transmission section
452 designation section
453 switch section

The invention claimed is:

1. A method for communication control performed by a device within a communication system that includes a communication apparatus, a first relay base station to which the communication apparatus is connected via a first wireless access link, a second relay base station to which the communication apparatus may be connected via a second wireless access link, and a donor base station connected to the first and second relay base station via a respective first and second backhaul link, the method comprising:
    acquiring network slice identification information identifying plural network slices for a communication service to be received by the communication apparatus;
    acquiring access link quality information related to a measured quality of the first wireless access link connecting the communication apparatus to the first relay base station;
    acquiring backhaul link quality information related to a measured quality of the first backhaul link connecting the donor base station to the first relay base station; and
    based on each of the network slice identification information, the access link quality information, and the backhaul link quality information, determining a slice-specific path for each slice of the plural slices for exchanging data between the communication apparatus and the donor base station, the slice-specific path for each slice of the plural network slices including at least one of the first wireless access link or the first backhaul link,
    wherein the determining the slice-specific path for each network slice of the plural network slices comprises:
        for each network slice of the plural network slices, designating one of the donor base station or the first relay base station as a slice-specific target parent relay base station, and
        providing slice-specific handover instructions to the first relay base station for handing over to the second relay base station any network slice of the plural network slices handled by the first relay base station based on subsequent backhaul link quality information indicating that a quality of the first backhaul link has deteriorated below a predetermined threshold.

2. The method according to claim 1, further comprising:
acquiring load information relating to a communication load of the first relay base station device,
wherein the slice-specific path is further determined based on the load information.

3. The method according to claim 2, wherein the communication service comprises at least one selected from a massive Machine Type Communication (mMTC) service, an enhanced Mobile BroadBand (eMBB) service, and an Ultra-Reliable and Low Latency Communication (URLLC) service.

4. The method according to claim 3, wherein the determining the slice-specific path comprises determining a path for each of the mMTC service, the eMBB service, and the URLLC service.

5. The method according to claim 1, wherein the access link quality information is acquired from the communication apparatus, and the backhaul link quality information is acquired from the first relay base station.

6. The method according to claim 1,
wherein the network slice identification information includes slice specific permissible delay information on a communication delay permissible by the corresponding network slice,
wherein the slice-specific path is further determined based on the permissible delay information.

7. The method according to claim 1, wherein
the communication apparatus is configured to simultaneously use two network slices of the plural network slices, and
the determining the slice-specific path includes determining one or more slice-specific paths through which the data is exchanged simultaneously for each of the two network slices.

8. The method according to claim 1, further comprising: instructing at least one of the communication apparatus or the first relay base station to form the slice-specific path for exchanging the data between the communication apparatus and the donor base station.

9. The method according to claim 1, further comprising:
determining, for one network slice of the plural network slices, that the quality of the first backhaul link has deteriorated below the predetermined threshold; and
instructing the first relay base station to hand over the one network slice to the second relay base station.

10. A device configured to perform communication control within a communication system that includes a communication apparatus, a first relay base station to which the communication apparatus is connected via a first wireless access link, a second relay base station to which the communication apparatus may be connected via a second wireless access link, and a donor base station connected to the first and second relay base station via a respective first and second backhaul link, the device comprising control circuitry configured to:
acquire network slice identification information identifying plural network slices for a communication service to be received by the communication apparatus;
acquire access link quality information related to a measured quality of the first wireless access link connecting the communication apparatus to the first relay base station;
acquire backhaul link quality information related to a measured quality of the backhaul link connecting the donor base station to the first relay base station; and
based on each of the network slice identification information, the access link quality information, and the backhaul link quality information, determine a slice-specific path for each slice of the plural slices for exchanging data between the communication apparatus and the donor base station, the slice-specific path for each slice of the plural network slices including at least one of the first wireless access link or the first backhaul link,
wherein the control circuitry determines the slice-specific path for each network slice of the plural network slices comprises:
for each network slice of the plural network slices, designating one of the donor base station or the first relay base station as a slice-specific target parent relay base station, and
providing slice-specific handover instructions to the first relay base station for handing over to the second relay base station any network slice of the plural network slices handled by the first relay base station based on subsequent backhaul link quality information indicating that a quality of the first backhaul link has deteriorated below a predetermined threshold.

11. The device of claim 10, wherein the control circuitry is further configured to instruct at least one of the communication apparatus or the first relay base station to form the slice-specific path for exchanging the data between the communication apparatus and the donor base station.

12. A non-transitory computer product containing a communication control program that causes a computer to perform a method for communication control within a communication system that includes a communication apparatus, a first relay base station to which the communication apparatus is connected via a first wireless access link, a second relay base station to which the communication apparatus may be connected via a second wireless access link, and a donor base station connected to the first and second relay base station via a respective first and second backhaul link, the method comprising:
acquiring network slice identification information identifying plural network slices for a communication service to be received by the communication apparatus;
acquiring access link quality information related to a measured quality of the first wireless access link connecting the communication apparatus to the first relay base station;
acquiring backhaul link quality information related to a measured quality of the backhaul link connecting the donor base station to the first relay base station; and
based on each of the network slice identification information, the access link quality information, and the backhaul link quality information, determining a slice-specific path for each slice of the plural slices for exchanging data between the communication apparatus and the donor base station, the slice-specific path for each slice of the plural network slices including at least one of the first wireless access link or the first backhaul link,
wherein the determining the slice-specific path for each network slice of the plural network slices comprises:
for each network slice of the plural network slices, designating one of the donor base station or the first relay base station as a slice-specific target parent relay base station, and
providing slice-specific handover instructions to the first relay base station for handing over to the second relay base station any network slice of the plural network slices handled by the first relay base station based on subsequent backhaul link quality information indicating that a quality of the first backhaul link has deteriorated below a predetermined threshold.

13. The non-transitory computer product according to claim 12, wherein the method further comprises:
instructing at least one of the communication apparatus or the first relay base station to form the slice-specific path for exchanging the data between the communication apparatus and the donor base station.

14. A communication system comprising a plurality of devices, the plurality of devices including at least:
a communication apparatus;
a first relay base station to which the communication apparatus is connected via a first wireless access link;
a second relay base station to which the communication apparatus may be connected via a second wireless access link; and
a donor base station connected to the first and second relay base station via a respective first and second backhaul link,
wherein at least one of the plurality of devices includes control circuitry configured to:
acquire network slice identification information identifying plural network slices for a communication service to be received by the communication apparatus;
acquire access link quality information related to a measured quality of the first wireless access link connecting the communication apparatus to the first relay base station;
acquire backhaul link quality information related to a measured quality of the first backhaul link connecting the donor base station to the first relay base station; and
based on each of the network slice identification information, the access link quality information, and the backhaul link quality information, determine a slice-specific path for each slice of the plural slices for exchanging data between the communication apparatus and the donor base station, the slice-specific path for each slice of the plural network slices including at least one of the first wireless access link or the first backhaul link,
wherein the slice-specific path for each network slice of the plural network slices is determined by:
for each network slice of the plural network slices, designating one of the donor base station or the first relay base station as a slice-specific target parent relay base station, and
providing slice-specific handover instructions to the first relay base station for handing over to the second relay base station any network slice of the plural network slices handled by the first relay base station based on subsequent backhaul link quality information indicating that a quality of the first backhaul link has deteriorated below a predetermined threshold.

15. The communication system of claim 14, wherein the control circuitry is further configured to instruct at least one of the communication apparatus or the first relay base station to form the slice-specific path for exchanging the data between the communication apparatus and the donor base station.

* * * * *